(12) United States Patent
Gauthier et al.

(10) Patent No.: US 7,539,944 B2
(45) Date of Patent: May 26, 2009

(54) IMPORTING DATA FROM A SOURCE DOCUMENT INTO A DESTINATION DOCUMENT

(75) Inventors: Matthew Charles Gauthier, Redmond, WA (US); Yaniv Inbar, Bellevue, WA (US); Tyson Murray, Maple Valley, WA (US); Wentao Chen, Sammamish, WA (US); Andy Verprauskus, Seattle, WA (US); Richard Jacques, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 11/061,904

(22) Filed: Feb. 18, 2005

(65) Prior Publication Data

US 2005/0177573 A1   Aug. 11, 2005

Related U.S. Application Data

(63) Continuation of application No. 09/819,176, filed on Mar. 27, 2001, now Pat. No. 6,948,134.

(51) Int. Cl.
*G06F 3/00* (2006.01)
(52) U.S. Cl. .................. 715/748; 715/739
(58) Field of Classification Search ............ 715/503, 715/504, 825, 804, 835, 738, 739, 748; 707/10; 345/503, 504
See application file for complete search history.

(56) References Cited

U.S. PATENT DOCUMENTS

| | | | | |
|---|---|---|---|---|
| 5,644,738 A * | 7/1997 | Goldman et al. | ............ | 715/825 |
| 5,983,268 A * | 11/1999 | Freivald et al. | ............ | 709/218 |
| 6,009,459 A | 12/1999 | Belfiore et al. | | |
| 6,493,006 B1 * | 12/2002 | Gourdol et al. | ............ | 715/825 |
| 6,507,351 B1 * | 1/2003 | Bixler | ............ | 715/810 |
| 6,523,022 B1 * | 2/2003 | Hobbs | ............ | 707/3 |
| 6,631,497 B1 * | 10/2003 | Jamshidi et al. | ............ | 715/514 |
| 7,085,994 B2 * | 8/2006 | Gvily | ............ | 715/500.1 |
| 7,117,435 B1 * | 10/2006 | Kotler et al. | ............ | 715/515 |
| 7,162,700 B1 * | 1/2007 | Rashkovskiy | ............ | 715/771 |

* cited by examiner

*Primary Examiner*—Dennis Bonshock
(74) *Attorney, Agent, or Firm*—Merchant & Gould P.C.

(57) ABSTRACT

Importing data from a source document into a destination document that is displayed within an application program associated with the destination document includes displaying a user interface region as part of the user interface of the application program. Importing the data also includes indicating in the user interface region at least a portion of external data within the accessed source document that is available for insertion into the destination document; and inserting a selected portion of external data into the destination document in response to user input selecting the portion of external data.

9 Claims, 25 Drawing Sheets

IMPORTING DATA FROM A SOURCE DOCUMENT INTO A DESTINATION DOCUMENT

CROSS REFERENCE TO RELATED APPLICATIONS

This Application is a continuation of prior U.S. patent application Ser. No. 09/819,176, entitled "Integrated Method For Creating A Refreshable Web Query," filed Mar. 27, 2001, which claims the benefit of priority under 35 U.S.C. §119(e) to provisional patent application Ser. No. 60/220,239 entitled "Method for Redirecting the Source of a Data Object Displayed in an HTML Document," filed on Jul. 21, 2000, both of which are hereby incorporated herein by reference in their entirety.

TECHNICAL FIELD

The invention generally relates to creating Web Queries, and more specifically relates to a method for graphically selecting and importing tabular data from a Web page into a MICROSOFT EXCEL 2002 spreadsheet program to create a refreshable Web Query. The invention further relates to generating refreshable Web Queries directly from a web browser program.

BACKGROUND

A Web Query is a range of cells, or tabular data, within a spreadsheet program, such as the MICROSOFT EXCEL spreadsheet program, whose content is derived from a Web page. The content of the Web Query has the same properties as the tabular data stored on the associated Web page. For example, if the tabular data displayed on the Web page is formatted as two decimal real numbers, the content within the Web Query will also be formatted as two-decimal real numbers. Once the content from the HTML document is imported into the spreadsheet program as a Web Query, the user may update the content of the tabular data by selecting a pre-defined command. These features make the Web Query a very powerful tool for creating a table whose content may be refreshed either manually or upon the occurrence of a specified event. Unfortunately, in previous versions of the MICROSOFT EXCEL spreadsheet program, the method for creating a Web Query was cumbersome and complicated. Typically, the user had to manually create a text file, known as an Internet Query ("IQY") file that contain specific structures and information. IQY files are text files that contain specific structure that instruct the MICROSOFT EXCEL spreadsheet program how to create a Web Query. Typically, the IQY file contains information such as the Uniform Resource Locator ("URL) and other properties that control how the data is imported and formatted. Creating an IQY file, however, requires the user to have specific information about the structure of the HTML document and data objects, such as the object identification number, for the data objects that they wan to import into the Web Query. As a result, creating an IQY file requires that the user have some level of programming skill. Consequently, many users found the Web Query feature too complicated to use.

One solution to this problem, which was introduced in the "MICROSOFT EXCEL 2000" spreadsheet program manufactured by the Microsoft Corporation of Redmond, Washington, was the creation of a dialog box to help the user create a Web Query. The dialog box allowed the user to import tabular data from a Web page without having to manually generate an IQY file. To create a Web Query using the dialog box, the user typed in the address of a remote location where the data was stored, such as a uniform resource locator ("URL") of the Web page that contained the tabular data or an HTML file stored on the local network. Once the user identified the location of the data, the user was required to import the data in one of three ways. First, the user could simply import the entire Web page or HTML file. Second, the user could import all instances of tabular data contained in the HTML file. Finally, the user could import specific instances of tabular data. Although importing the entire Web page or all instances of tabular data are the easiest methods for importing tabular data, these methods produce results that the user do not want. This is due to the fact that Web pages typically contain superfluous information, such as graphics, banners, ads, and the like, that users are not interested in. Therefore, the method of importing specific instances of tabular data is the most common method chosen by users. However, selecting specific instances of tabular data to import into the MICROSOFT EXCEL spreadsheet program required the user to supply an HTML identifier associated with the tabular data. The HTML identifier is typically a table identification string or an index number that provides the relative position of the tabular data within the HTML document. For example, if the tabular data was a TABLE object, it would have the following format in the HTML document: <TABLE ID="identification string">. . . data . . . </TABLE>. The user had to manually determine the identification string. The user had to determine the identification string by looking at the source of the HTML. However, sometimes, the identification string may not be provided. Therefore, in these instances, the user had to determine the index number, which is simply the ordinal number of the TABLE object, as it appeared in the HTML document. Once the user finished supplying this data, a Web Query was created whose content was imported from the URL or HTML file specified by the user. Although the use of the dialog box eliminated the need for user to manually generate an IQY file, the user still had to have intimate knowledge of the structure of the Web page to create a Web Query. Because the average user does not have the requisite knowledge about HTML file structure to effectively create a Web Query, the average user simply found it too difficult and many times too frustrating to create a Web Query to specific instances of tabular data. Typically, users created a Web Query to the entire HTML page and returned the all the data to a new blank worksheet dedicated solely to the Web Query. The users would then create worksheet links from the data they wanted to perform analysis on to the Web Query worksheet. This lead to numerous errors because when the Web Query was refreshed, the location of the data on the Web page may have changed. For example, suppose the user wanted to create a Web Query to an entire page that contained financial data and they discovered that the particular stock quote that they are interested in was contained in cell D9. The user would then create a link between cell D9 on the Web Query sheet to another worksheet where they performed their analysis. When the user would refresh the Web Query, however, the Web page may have changed by the addition of a new banner ad or the like, so that the stock price quote was now stored in cell G11 in the Web Query sheet. The financial analysis would then return a result that is different than what the user expected because the analysis is linked to cell D9, which contained incorrect data after the Web Query was refreshed.

Furthermore, creating a Web Query is not the most intuitive process and therefore, can be difficult for the average person. To create a Web Query, the user had to open a Web Query dialog box from within the MICROSOFT EXCEL spreadsheet program and then manually input the URL of the Web site that contains the tabular data they wished to insert into their spreadsheet program. Unfortunately, most users did not even realize that they could access tabular data in an HTML document from the spreadsheet program. Rather, most users typically exited the spreadsheet program and accessed the HTML document or Web page through an Internet browser, such as Microsoft's INTERNET EXPLORER browser program. Users could then select the tabular data in the Web page and invoke the Copy-Paste command to transfer the tabular data from Web page to the MICROSOFT EXCEL spreadsheet program. This required the user to switch between the Web browser program and the MICROSOFT EXCEL spreadsheet program to paste the data into a range of cells in the worksheet.

For example, suppose a user wanted to download stock information from an Internet site into a MICROSOFT EXCEL worksheet to perform financial analyses. Typically, a user would create a new MICROSOFT EXCEL worksheet and would then open a new active window with a Web browser program. Next, the user would load the Web site that contained the desired stock information. The user would then select a table or tabular data of stock information and invoke the Copy command. Next, the user would be required to switch to the window containing the MICROSOFT EXCEL spreadsheet program, select a position in the worksheet to insert the data and invoke the Paste command. If the content within the imported table were static, the Copy-Paste method of importing tabular data would be complete. However, stock information is typically dynamic in nature and continually changes. Therefore, for the user to update their tabular data, the user had to continually invoke the Copy-Paste method to import the new data.

Unfortunately, the Copy-Paste method to import tabular data is inefficient and time consuming. When the user wants to refresh, or update the tabular data, they must repeat the Copy-and-Paste process all over. Furthermore, using the Copy-Paste method for continually updating tabular data can lead to errors being introduced into the data. For example, the user may select the wrong table in the Web page to update, or in the case where a range of the tabular data is imported, the user may inadvertently select a different size range when updating the data. In either instance, selecting data to update that is different from the data initially selected can lead to numerous errors in the user's analysis. Creating a refreshable Web Query in these instances would eliminate the repetition of using the Copy-Paste method to update the tabular data and reduce the occurrence of errors committed by the user. Moreover, most users are unaware that the Web Query feature exists or how to access it. For those users who are aware of the Web Query feature, the process of creating a Web Query is too complicated for them to use the feature with any regularity.

Thus, there is a general need in the art for a more convenient and "discoverable" method for creating a refreshable Web Query. There is a further need in the art for a more convenient and efficient method for a user to discover the option to create refreshable Web queries. There is a still a further need in the art for a more efficient, integrated, and logical method of creating a refreshable Web Query in the MICROSOFT EXCEL spreadsheet program directly from an Web browser program.

SUMMARY OF THE INVENTION

Generally described, the present invention meets the above-described needs to make creating a Web Query simpler and more intuitive for the average user. The invention is an improvement to the Web Query dialog box that allows a user to graphically create a Web Query using the "What You See Is What You Get" ("WYSIWYG") technology. The improvement is a method that allows a user to graphically select an instance of tabular data displayed in a Web page and import the tabular data into a MICROSOFT EXCEL 2002 worksheet as a Web Query. The method begins when a user command is received to import the tabular data into the worksheet. Upon receiving the command to import the tabular data, an Internet browser module is launched within a Web Query dialog box open in the application program. The user then navigates to the URL of the Web page that contains the tabular data he or she wishes to import. Next, the Web page containing the tabular data is loaded into the dialog box. The user then typically selects at least one instance of tabular data to import into the spreadsheet program as a Web Query using a graphical method. The tabular data is then imported without the user having to supply any intimate information about the HTML structure. Alternatively, the user may not select any tabular data, in which case the entire Web page will be imported into the spreadsheet program as a Web Query.

More specifically, the invention provides a graphical method for selecting tabular data from a Web page and importing, or copying the tabular data to another file, such as anther Web page, or to another application program. Once the Web page is loaded into the dialog box, the HTML tree is scanned to identify all the tabular data present within the HTML file. For each instance of tabular data encountered, an icon is created and associated with that instance of the tabular data. For example, the icon typically consists of a box consisting of a yellow background containing a black arrow pointing at the tabular data. This provides a graphical indication to the user which objects within the HTML document are tabular data.

Next, the absolute position of each instance of tabular data is calculated. Each icon is then positioned proximate to the absolute position of the associated instance of tabular data. Finally, the icons are added to the body of the HTML document with an associated zIndex set to the maximum allowable value, which corresponds to the highest layer in the HTML document so that the icons are displayed in the top-most layer of the Web page. This insures that the icons will always be visible to the user. The icons provide the user with a visual representation of all the possible instances of tabular data contained in the Web page that may be imported into the spreadsheet program.

Once the icons are displayed on the Web page in the Web Query dialog box, a determination is made as to whether the user has selected at least one instance of tabular data within the Web page. When the user places the cursor over one of the icons associated with an instance of tabular data, also known as a "mouseover" event, the user is provided with several graphical indicators. First, the visual appearance of the icon is altered, such as changing the background color of the icon. Next, a second visual indicator is provided to the user by drawing a highlight image, such as a box around the tabular data. To draw the highlight image, the dimensions of the tabular data are retrieved from the HTML document and combined with the absolute position of the tabular data to correctly position the highlight image over the tabular data. Next, the outline color of the highlight image is set to a predetermined value to emphasize the tabular data. However, the highlight image contains a "transparent" GIF image. This insures that the user will still be able to view the tabular data while the image is positioned over it. Both of these graphical indicators remain visible to the user as long as the "mouseover" event occurs.

Next, a determination is made whether the user has chosen to import at least one instance of tabular data into the spreadsheet program. If the user has selected the tabular data, the visible indicator of the icon and the background color for each instance of tabular data are altered. First, the visual appearance of the icon is altered again. For example the icon may initially be a black arrow in a yellow box. Upon the occurrence of a "mouseover" event, the color of the icon may change from yellow to green. In the event that the user selects the tabular data by clicking the icon, the arrow within the icon may be changed into a check mark, or alternatively, the color of the icon may change from green to blue. Additionally, the background value of the tabular data is changed from its original color to a blended color comprising the system color and white. By changing the background color of the tabular data, the user can easily discern which instances of tabular data they have selected. Finally, when the user imports the tabular data, a table identification string, which indicates the position of each instance of tabular data within the HTML document, is recorded. However, in the instance where there is no table identification string associated with the tabular data, the index number associated with the tabular data is computed and recorded. Lastly, the URL associated with the instances of tabular data together with either the table identification strings or index number are passed to the Web Query in the application program.

The invention may also determine whether an HTML document has multiple frames and create a Web Query back to a particular frame of the HTML document. Some Web designers break their Web page into multiple frames. Each frame may be thought of as a separate window that breaks the Web page into partitions of useable data, where each partition contains a single HTML document. In this way, web authors may present large quantities of data in a more meaningful and useful way.

When a Web page contains multiple frames, each frame is scanned to determine each instance of tabular data. Next, icons are created and associated with each instance of tabular data on each frame. However, each frame has its own window and URL, so when creating the Web Query, the URL of the frame, rather than the URL of the parent frame is used to create the Web Query. Furthermore, whenever an instance of tabular data is selected in a frame, any instances of tabular data that were previously selected in another frame are deselected. Only multiple instances of tabular data selected within a single frame may be imported to the spreadsheet program. Restricting the creation of a Web Query to a single frame is a limitation of previous versions of the MICROSOFT EXCEL spreadsheet program and not the present invention.

Additionally, the present invention meets the above-described need to make Web queries more accessible to a user in a software utility, known as a Web Query Smart Tag (WQST) utility. The WQST utility allows a user to initiate the process of creating Web queries directly from an Internet browser module in one of several methods. The first method, know as the "Copy-Paste Web Query" method begins when a user pastes tabular data from a Web page into a spreadsheet program. When the user pastes the tabular data into the spreadsheet program, a determination is made whether the refreshable Web Query command should be presented to the user. If the decision is made to present the Web Query command to the user, an option to create a Web Query appears on a special drop-down menu, called an on-object user interface ("OOUI") also known as a "Smart Tag." associated with the MICROSOFT EXCEL 2002 spreadsheet program. The Smart Tag appears with the tabular data regardless of whether or not a Web Query is appropriate. This Smart Tag is a MICROSOFT OFFICE XP-wide "Paste Recovery" feature that is fully disclosed in the U.S. patent application Ser. No. 09/620,876 entitled "On-Object User Interface," filed on Jul. 21, 2000, and incorporated herein by reference.

When the user selects the option to create a Web Query from the Smart Tag, the Web Query dialog box is opened and the entire Web page is loaded into the Web Query from the location where the tabular data on the Clipboard originated. The user reselects the same tabular data, which is now displayed in the dialog box to create a refreshable Web Query.

More specifically, the "Copy-Paste Web Query" method provides a heuristic procedure for determining whether the option to create a refreshable Web Query should be displayed to the user in the Smart Tag when the user initiates the step of pasting a tabular data from a Web page into a MICROSOFT EXCEL 2002 worksheet. When the user pastes the data into the MICROSOFT EXCEL 2002 spreadsheet program, the tabular data is stored in a temporary memory location called the "Clipboard." The "Copy-Paste Web Query" method first determines whether the application program that the tabular data was copied from supports CF_HTML formatted data. CF_HTML is a data format typically used by the MICROSOFT OFFICE (both MICROSOFT OFFICE XP and previous versions of MICROSOFT OFFICE) suite of application programs to transfer data between two application programs via the Clipboard. If the application program does not support the CF_HTML data format, the option to create a refreshable Web Query will not be presented to the user and tabular data will be copied into the spreadsheet program in the usual manner.

However, if the application supports the CF_HTML data format, the "Copy-Paste Web Query" method determines whether a first identifier tag associated with the tabular data, which identifies the application program used to create the tabular data, is set to a specified value. If the first identifier tag is set to the specified value, then the WQST utility retrieves a URL associated with the Web site containing the tabular data to be imported. Next, the determination is made whether the URL is well formed. That is, the determination is made whether the URL contains one of the following text strings: "http://," "https://," "ftp://," or "file://." If the URL is well formed, then the option to create a refreshable Web Query is presented to the user on the Smart Tag. However, if, any one of the preceding determination steps fails, the option to create refreshable Web Query will not be presented to the user on the Smart Tag.

The WQST utility may also be embedded in a second method known as "Export to Microsoft Excel." The "Export to Microsoft Excel" module allows a user to create a refreshable Web Query in the MICROSOFT EXCEL 2002 spreadsheet program directly from the MICROSOFT INTERNET EXPLORER browser program. To create a refreshable Web Query using the "Export to Microsoft Excel" module, the user positions the cursor over an instance of tabular data in a Web page open in the MICROSOFT INTERNET EXPLORER browser program. Next, the user activates a context menu by depressing the right mouse button. The user then selects the command "Export to Microsoft Excel" from the context menu, which launches the MICROSOFT EXCEL 2002 spreadsheet program. The tabular data that the cursor was positioned over at the time the user selected the "Export to Microsoft Excel" is then imported into a MICROSOFT EXCEL 2002 worksheet as a refreshable Web Query.

The WQST utility may also be embedded in a third module known as "Edit with Microsoft Excel." The "Edit with Microsoft Excel" module allows a user to open the entire file or choose a portion of the file to import into the MICROSOFT EXCEL 2002 spreadsheet program as a refreshable Web Query. If the HTML document was created using the MICROSOFT EXCEL 2002 spreadsheet program, then the HTML document is loaded directly into the MICROSOFT EXCEL 2002 spreadsheet program. However, if the HTML page was not created using the MICROSOFT EXCEL 2002 spreadsheet program, then the module creates a new worksheet and automatically brings up the Web Query dialog box and allows users to create a Web Query to the entire page or individual instances of tabular data.

To begin the creation of the refreshable Web Query, the user first navigates to the desired HTML document in the MICROSOFT INTERNET EXPLORER browser program. The user then invokes the drop-down Edit menu from the menu bar within the MICROSOFT INTERNET EXPLORER browser program. The user then selects the "Edit with Microsoft Excel" command. The "Edit with Microsoft Excel" module then determines whether the HTML document was created with the MICROSOFT EXCEL 2002 spreadsheet program or another Web development program by examining an identification tag associated with the HTML document. The identification tag indicates what Web development program was used to create the HTML document. If the value of the identifier tag indicates that the MICROSOFT EXCEL 2002 spreadsheet program was used to create the particular HTML document, then the "Edit with Microsoft Excel" module opens the MICROSOFT EXCEL 2002 spreadsheet program and loads the entire HTML document within a MICROSOFT EXCEL 2002 workbook.

If however, the identifier tag indicates that another Web development application program was used to create the HTML file, then the "Edit with Microsoft Excel" module launches the MICROSOFT EXCEL 2002 spreadsheet program, creates a new workbook and opens a new Web Query dialog box, which is preloaded with the URL of the HTML document. The user can then select either the entire Web page or specific instances of tabular data to import into the Web Query.

That the invention improves over the drawbacks of methods for creating refreshable Web queries and accomplishes the advantages described above will become apparent from the following detailed description of the exemplary embodiments and the appended drawings and claims.

DETAILED DESCRIPTION OF EMBODIMENTS OF THE INVENTIONS

Figure 1:
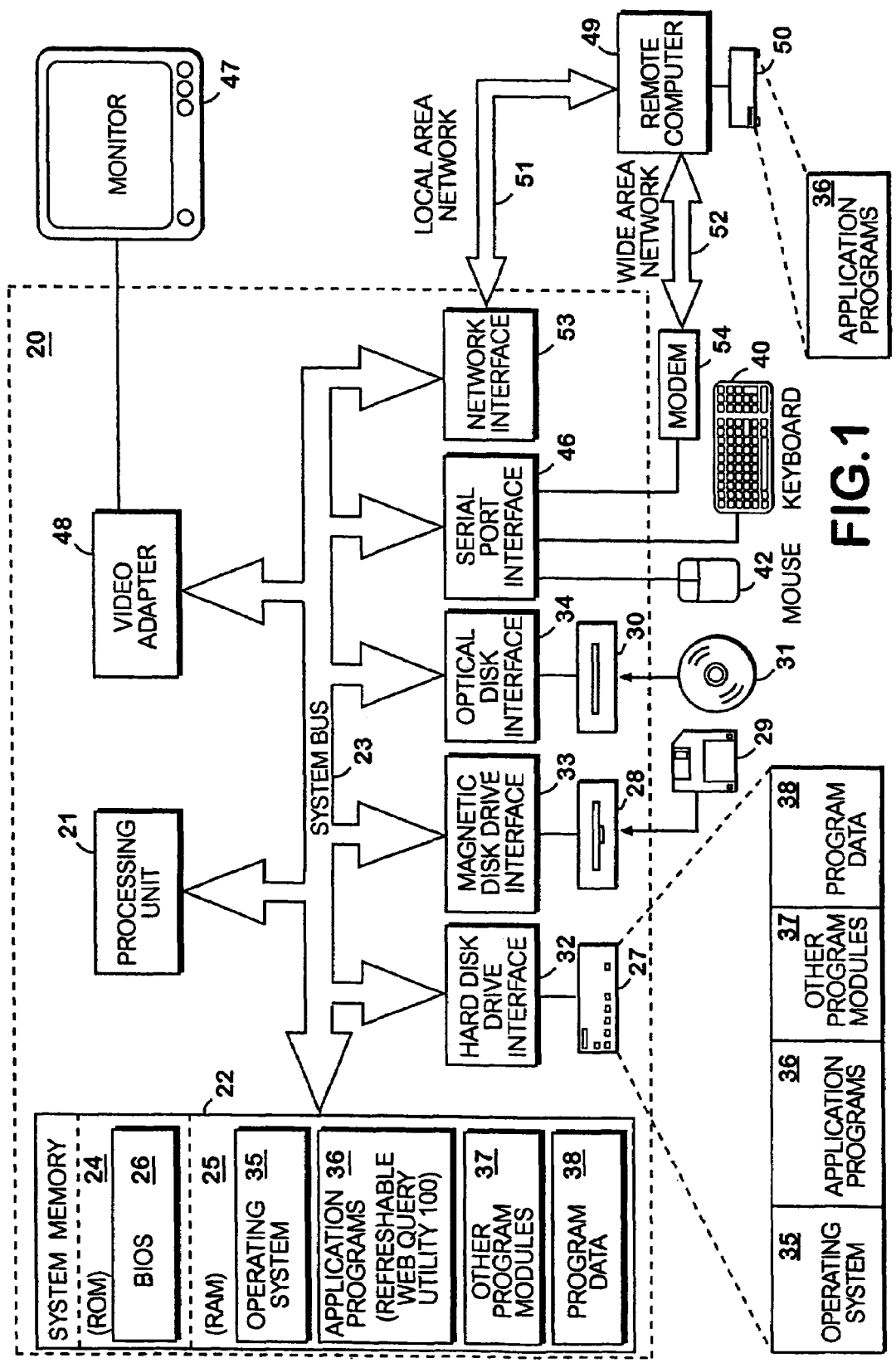
FIG. 1 is a block diagram of a personal computer that provides the operating environment for an embodiment of the present invention.

The present invention is directed toward a method for allowing a user to graphically select an object (i.e., tabular data) from a Web page and import it to a spreadsheet program. An exemplary embodiment of the invention is embodied in the "MICROSOFT EXCEL 2002" spreadsheet program, which is a spreadsheet program manufactured by the Microsoft Corporation of Redmond, Wash.

Although the exemplary embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

Referring now to the drawings, in which like numerals represent like elements throughout the several figures, aspects of the present invention and the exemplary operating environment will be described.

Exemplary Operating Environment

FIG. 1 and the following discussion are intended to provide a brief, general description of a suitable data computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, such as the WQST (Web Query Smart Tag) utility 100, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device, or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Embodiments of the Invention

Web Query Dialog

The Web Query dialog simplifies the task of importing objects from a Web page into an application program. Specifically, the Web Query dialog allows users to graphically select tabular data from a Web page that they wish to import into a spreadsheet program, such as Microsoft's MICROSOFT EXCEL 2002 spreadsheet program. When the user selects the option to import tabular data from a Web page into MICROSOFT EXCEL 2002 spreadsheet, a Web Query dialog box associated with MICROSOFT EXCEL 2002 appears within the display. The Web Query dialog box hosts a Web browser control, which is a dynamic link library ("DLL") control, known as "SHDOCVW.DLL." Hosting a Web browser control within a Web Query dialog box is well known in the art and therefore, a complete description of hosting a Web browser control in a dialog box is not described in this application.

The Web browser control, SHDOCVW.DLL in turn, hosts a Web browser module, which is another DLL control, known as "MSHTML.DLL." The MSHTML.DLL control is the browser component for Microsoft's MICROSOFT INTERNET EXPLORER Web browser application program. Hosting the Web browsing module, MSHTML.DLL, or any other Web browsing module, provides the Web browser control the ability to display Web pages in a graphical format, such as HTML. In addition to allowing the Web browser control to display Web pages, the Web browsing module allows the Web developer, through the Web browser control, to programmatically interact with the elements of the HTML document through a Document Object Model ("DOM"). For example, the Web developer can programmatically look at the collection of table elements in the Web page, to programmatically compute the top and left coordinates of objects within the Web page, and the like.

Hosting the MSHTML.DLL control in Web Query dialog box allows the user to graphically navigate around the Web page and graphically select objects within Web page while the Web page is displayed the Web Query dialog box. The HTML format also allows the multiple Web pages to be linked together in a graphical fashion. This allows the user to open another Web page by selecting an object displayed in the Web page using a pointing device, such as a mouse, rather than manually entering the textual address of the Web page in an address bar.

Once the Web browser control, SHDOCVW.DLL is opened in the Web Query dialog box, an initial Web page is displayed. The initial Web page may be any Web site that the user has set as their "home page" for their MICROSOFT EXCEL 2002 spreadsheet program. If for some reason the user has not assigned a "home page" within their MICROSOFT EXCEL 2002 spreadsheet program, the initial web page would be the Web page that is set as the default page in the registry for the user's Web browser program. However, if the user has not assigned a home page for their Web browser program, then the initial page will be loaded with a predetermined URL that is hard coded into the Web Query.

For example, if the user's spreadsheet program is the MICROSOFT EXCEL 2002 spreadsheet program, and the user's Web browser program is the MICROSOFT INTERNET EXPLORER browser program, the initial Web page will be the URL stored at the registry location "HKey_Current_User\Software\Microsoft\office\10.0\Excel\Options\Web Query HomePage." If this registry entry does not exist, then the registry location "HKey_Current_User\Software\Microsoft\Internet Explorer\Main\Start Page," which contains the user's MICROSOFT INTERNET EXPLORER browser program's initial web page is examined. If, however, this registry location does not exist, the dialog box is then loaded with a predetermined URL, such as "http://www.msn.com" or any other URL. Once the initial page is loaded, the user has the freedom to navigate to any Web page that contains tabular data they are interested in importing to a spreadsheet program by graphically hot-linking to a remote site or alternatively manually inputting the valid URL of the desired Web page.

As another alternative, the user may select the desired URL from a drop-down menu that contains a list of the most recently viewed Web sites. It should be noted that while the user who wishes to create a Web Query will typically navigate to a Web page that contains tabular data, the user may use the Web Query dialog box to navigate to any site on the World Wide Web, not only those that contain tabular data.

Once a Web page is displayed within the Web Query dialog box, the data objects, such as tabular data within the Web page, are parsed out. The triggering event is the activation of the Web Query dialog box and the downloading of the Web page into the Web browser module hosted in the dialog box.

Once the Web page has finished loading, the HTML document is scanned for data objects, such as tabular data that may be imported into the MICROSOFT EXCEL 2002 spreadsheet program. For example, if the user creates a Web Query in the MICROSOFT EXCEL 2002 spreadsheet program, the Web page is scanned for tabular data when it is downloaded into the Web Query dialog box. Similarly, if the user is importing data into a presentation program, such as the MICROSOFT POWERPOINT presentation program, the Web page will be scanned for graphical data. Please note that for purposes of this application only, the discussion will be directed toward importing tabular data into the MICROSOFT EXCEL 2002 spreadsheet program. However, those skilled in the art will appreciate that objects of other formats, such as text, graphical, and database may be imported into other application programs that support such data formats without departing from the scope of the invention.

For each instance of tabular data encountered, an icon is created and associated with the tabular data. The icons help the user quickly identify every instance of tabular data that may be imported into the spreadsheet program. For example, tabular data may be stored in one of several tags, such as TABLE, PRE, XMP, LISTING, and PLAINTEXT, within the HTML document. Therefore, for each of the above-listed tags encountered in the HTML document, an icon is generated and associated with each tag. However, a TABLE tag may be used as a placeholder or a spacer within the HTML document and may not contain any meaningful data. Consequently, it is helpful to omit those particular instances of TABLE tags that are used as placeholders. Therefore, before associating an icon with an instance of tabular data stored in a TABLE tag, the horizontal and vertical dimensions of the TABLE tag are retrieved. If either the horizontal or vertical dimension is less than a threshold value, an icon is not associated with that particular TABLE tag. For example, the threshold value to determine whether a TABLE tag is used as a spacer may be 8 pixels because this is the minimum dimension of a standard text character. In this way, any TABLE object having either a vertical or horizontal dimension smaller than 8 pixels likely will not contain meaningful data and thus will be bypassed.

Once an icon is associated with each instance of tabular data, the absolute position of the upper left corner for each instance of tabular data is computed. Typically, in an HTML document, the position of each object within the HTML document is stated relative to a parent object. The position of the parent object is stated relative to the body of the HTML document. Therefore, to calculate the absolute position of each instance of tabular data, the relative positions for each instance of tabular data are retrieved from the document object model("DOM"). Next, for each instance of tabular data, the relative position is added to the relative position of its parent. Thus, a total relative position for each instance of tabular data is obtained. Next, the total relative position for each tabular data is added to the absolute position of the beginning of the body of the Web page to obtain the absolute position for each instance of tabular data. This calculation is performed twice: once for the vertical, or "up" position and once for the horizontal, or "left" position. Typically, the absolute position for the upper left corner of each instance of tabular data is calculated. However, the absolute position of any portion of the tabular data may be calculated without altering the scope of the invention. Once the absolute position of the upper left corner of the tabular data is calculated, an icon is inserted proximate to the calculated absolute position into the HTML document. This insures that the user can graphically associate the icon with the tabular data.

Figure 2:
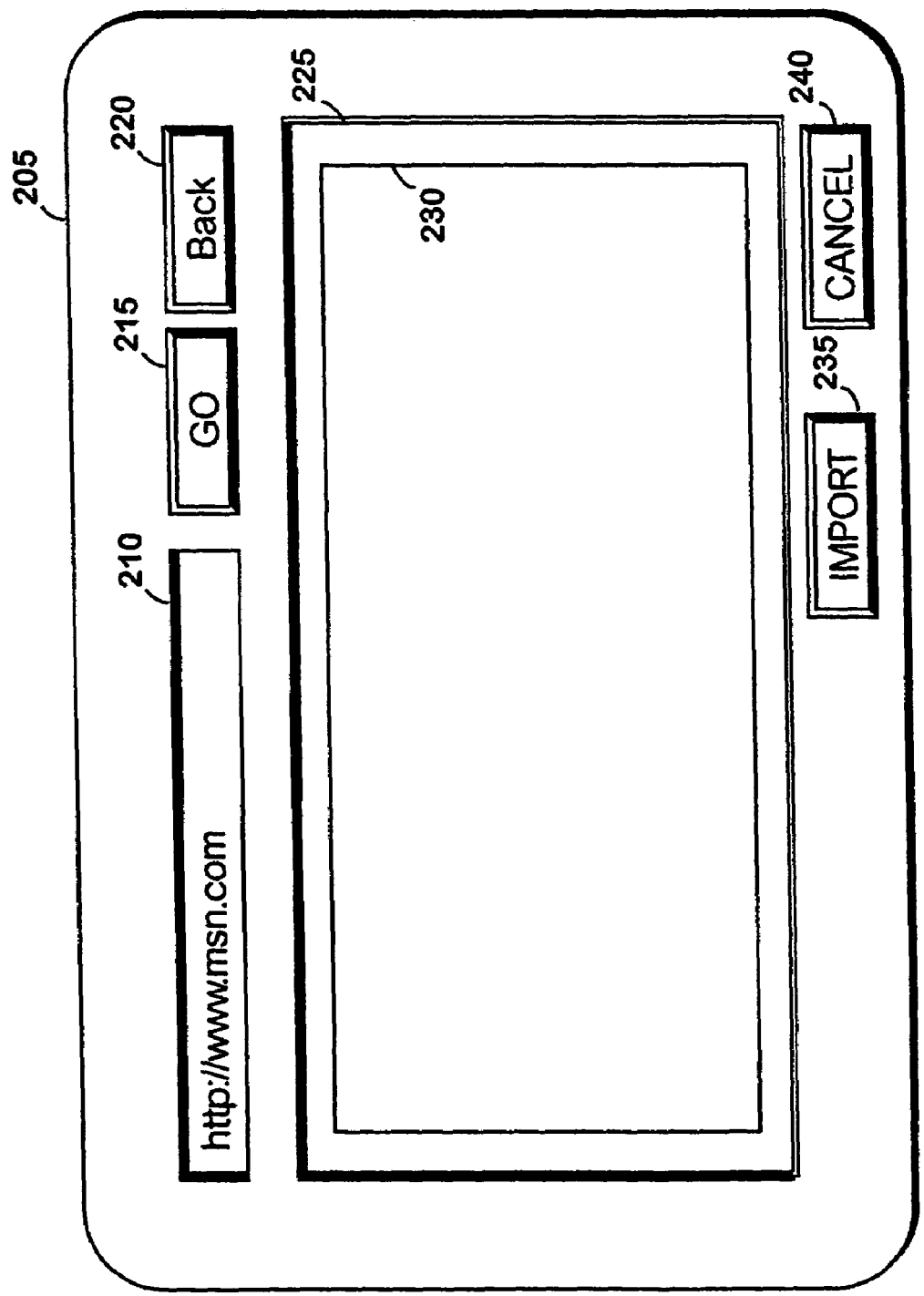
FIG. 2 is a block diagram of a dialog box illustrating the interdependent relationship between the MICROSOFT EXCEL 2002 spreadsheet program, a Web browser control, and a Web browser component.

Turning now to the figures, FIG. 2 is an illustration of how the Web Query dialog box 205 displays a Web page. The Web Query dialog box 205 is typically displayed within the MICROSOFT EXCEL 2002 spreadsheet program. The Web Query dialog box 205 typically contains an address bar 210 for displaying the URL of the Web page that is currently displayed. The Web Query dialog box 205 also contains a series of command buttons, such as an "GO" button 215 to download the URL displayed in the address bar 210 and a "BACK" button 220 to display previous URLs. The dialog box 205 also contains an "IMPORT" button 235 that allows the user to import tabular data and a "CANCEL" button 240 that may be used to abort the Web Query operation and close the Web Query dialog box 205.

The dialog box 205 also runs a Web browser control 225, also known as SHDOCVW.DLL. The Web browser control 225 is an OCX that is capable of hosting a Web browser module or any other ActiveX documents, such as word processor or spreadsheet programs. The Web browser control 225 in turn hosts a Web browser module called MSHT-ML.DLL, which is capable of parsing and displaying HTML documents. Thus, in this manner, the Web browser control 225 is capable of displaying Web pages in the dialog box 205.

Figure 3:
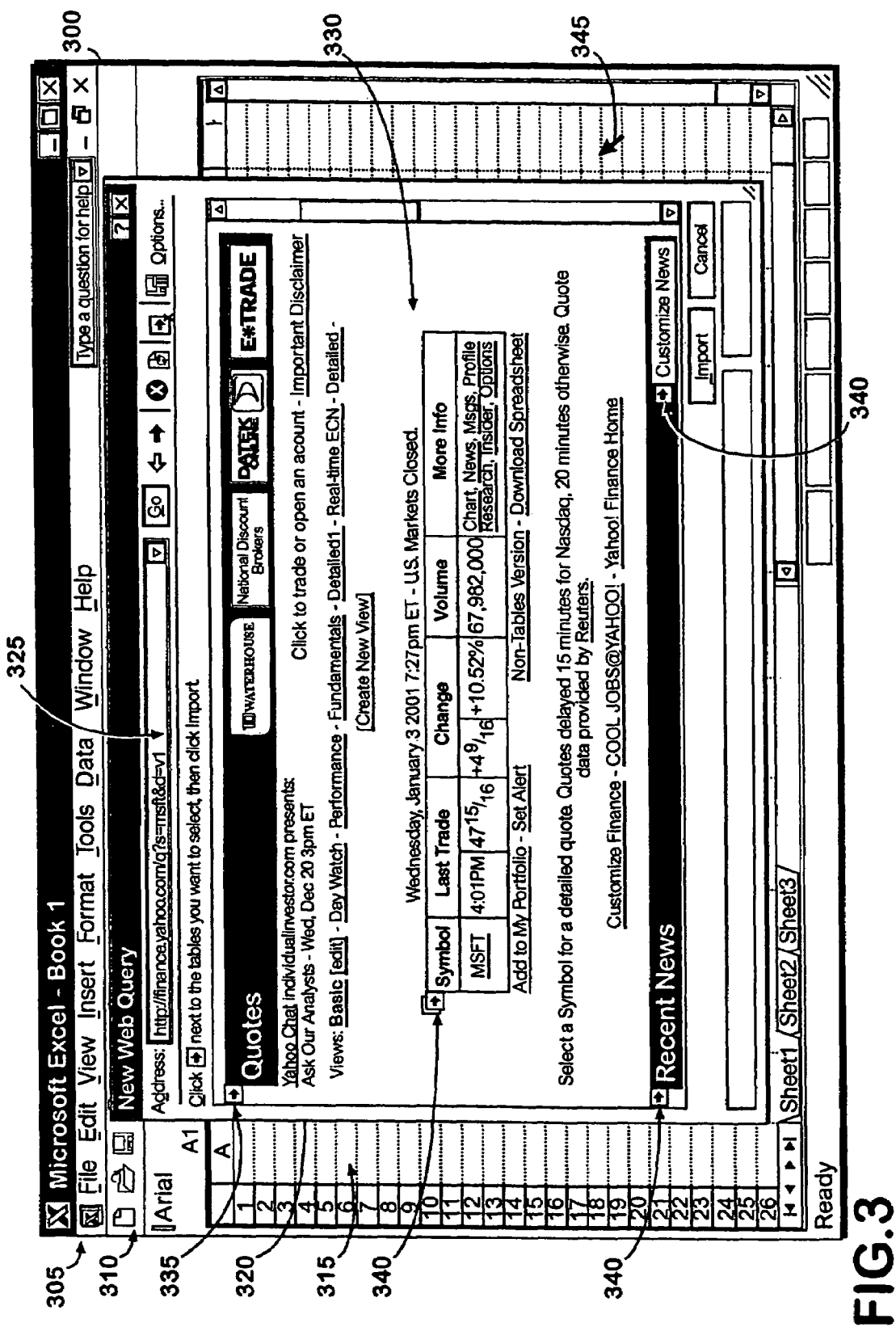
FIG. 3 is a screen display of a Web Query dialog box in a MICROSOFT EXCEL 2002 spreadsheet program window.

FIG. 3 is an illustration of the window 300 showing a typical screen display in a MICROSOFT EXCEL 2002 spreadsheet program when the user has selected the option to import external data into a MICROSOFT EXCEL 2002 worksheet. The MICROSOFT EXCEL 2002 window 300 includes a drop-down menu bar 305 and a command bar 310. The MICROSOFT EXCEL 2002 window 300 also contains a viewing area 315. The contents of the MICROSOFT EXCEL 2002 program are viewed in the viewing area 315, which contains a plurality of cells that may contain text, numbers, formula or the like.

Associated with the MICROSOFT EXCEL 2002 window 300 is a "New Web Query" dialog box 320 that appears within the spreadsheet program. The New Web Query dialog box 320 contains a standard address bar 325 that contains the URL associated with a Web page and a viewing area 330 that displays the contents of the Web page. Typically, the address bar 325 will first contain an initial URL that is pre-loaded when the New Web Query option is selected. Normally, the initial URL is the address of the user's startup Web page contained in the registry key "HKey_Current_User\Software\Microsoft\Office\10.0\Excel\Options\WebQueryHomePage." However, if the user did not store an initial startup Web page selected for the MICROSOFT EXCEL spreadsheet program, the Web page that is stored in the registry key "HKey_Current_User\Software\Microsoft\Internet Explorer\Main\Start Page" as the home page for the user's MICROSOFT INTERNET EXPLORER browser program is loaded. If however, the user does not have a URL address listed as the home page for their MICROSOFT INTERNET EXPLORER browser program, a predefined URL, such as "www.msn.com," is loaded into the address bar. This last predefined URL is "hard coded" into the MICROSOFT EXCEL 2002 spreadsheet program. At this point, the user is free to navigate the Internet to locate the Web page containing the tabular data they wish to import. The user may manually input the URL of the Web site into the address bar 325 or use a pointing device to maneuver through the Internet. Once the user has selected the appropriate Web page, it is downloaded into the Internet browser module. In the illustration, the address bar contains the URL "http://finance.yahoo.com/q?s=msft&d=v1," which is associated with the Web page displayed in the viewing area 330 of the dialog box 320.

A plurality of icons 340, each having a visual attribute, are displayed proximate to each instance of tabular data in the Web page. Each icon 340 provides a visual indication to the user of which objects on the Web page are tabular data and can be imported into the spreadsheet program. Additionally, an icon for the entire Web page 335 is displayed in the upper left corner of the viewing area 330. This indicates to the user that the contents of the entire Web page may be imported into the spreadsheet program. The icons associated with each instance of tabular data 340 and the icon for the entire Web page 335 all have at least one visual attribute, such as a color, a symbol, text, a font, or a combination of these elements associated with them. For example, in the illustration, each icon (335, 340) comprises an arrow surrounded by a box, whose background color is set to yellow. These icons (335, 340) provide the advantage of quickly identifying objects in the Web page that contain tabular data. In this way, the user may simply look at the Web page displayed in the New Web Query dialog box 320 and obtain a graphical representation of what elements may be imported into the Web Query, rather than having to review the underlying HTML document.

Figure 4:
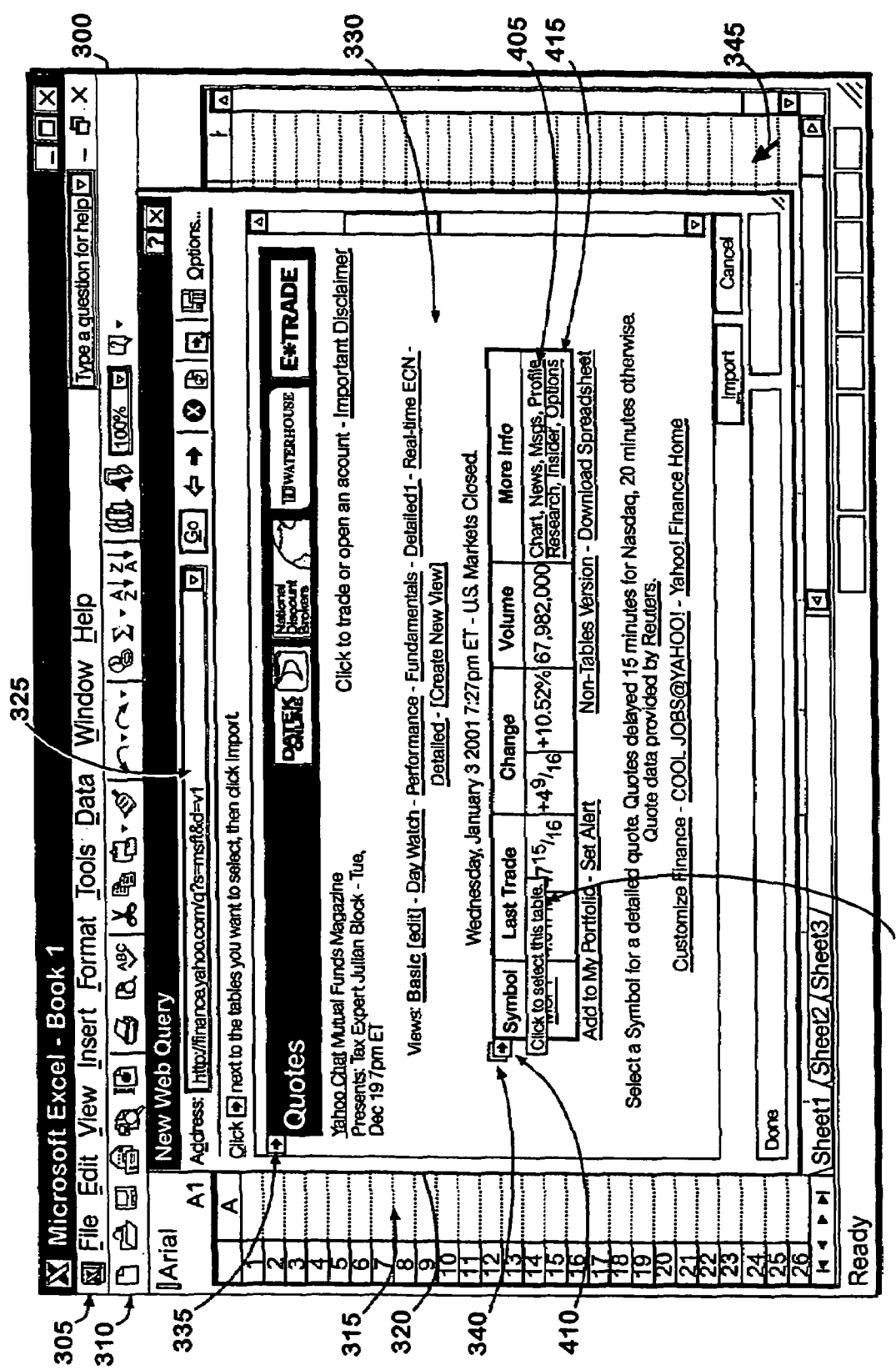
FIG. 4 is a screen display of a Web Query dialog box after the user has positioned the cursor over the icon associated with tabular data to import to a MICROSOFT EXCEL 2002 worksheet.

FIG. 4 is an illustration of a typical screen display showing the MICROSOFT EXCEL 2002 window 300 after the user has selected an instance of tabular data from the Web page. The illustration shows that the cursor 345 is positioned over the icon 410 associated with the tabular data 405. Whenever the cursor 345 is positioned over the icon 410, or any other icon (which is known as a "mouseover" event), the visual attribute associated with the icon 410 is altered. For example, in the figure and the exemplary embodiment, the background color of the icon 410 changed from yellow to green whenever the cursor 345 is positioned over the icon 410. This provides a visual indication to the user that the tabular data is available to be selected. Additionally, during a "mouseover" event, a second indicator, such as a box 415 having the same dimensions as the tabular data, may be positioned over the tabular data 405 associated with the icon 410. This second indicator provides an additional visual sign to the user illustrating which tabular data on the Web page the user may select. The second indicator comprises a GIF image 415. The GIF image 415 comprises a bordered box around a transparent high light image. The bordered box comprises a color value that corresponds to a dark color (e.g. blue), which visually separates the tabular data 405 from the rest of the Web page. The high light, or interior of the box comprises a transparent GIF-formatted image. The transparent GIF-formatted image allows the user to see the tabular data 405 through the box. Additionally, a text box 420 may also be displayed to provide the user with additional information about the tabular data. In the exemplary embodiment, whenever a mouseover event occurs, a text box 420 appears proximate to the icon 410 with the instruction "Click to select this table." Those skilled in the art will appreciate that other appropriate instructions may be placed within the text box 420 without altering the scope of the invention. For example, the text box 420 may alternatively contain the name of the tabular data, if the tabular data is a named range.

Figure 5:
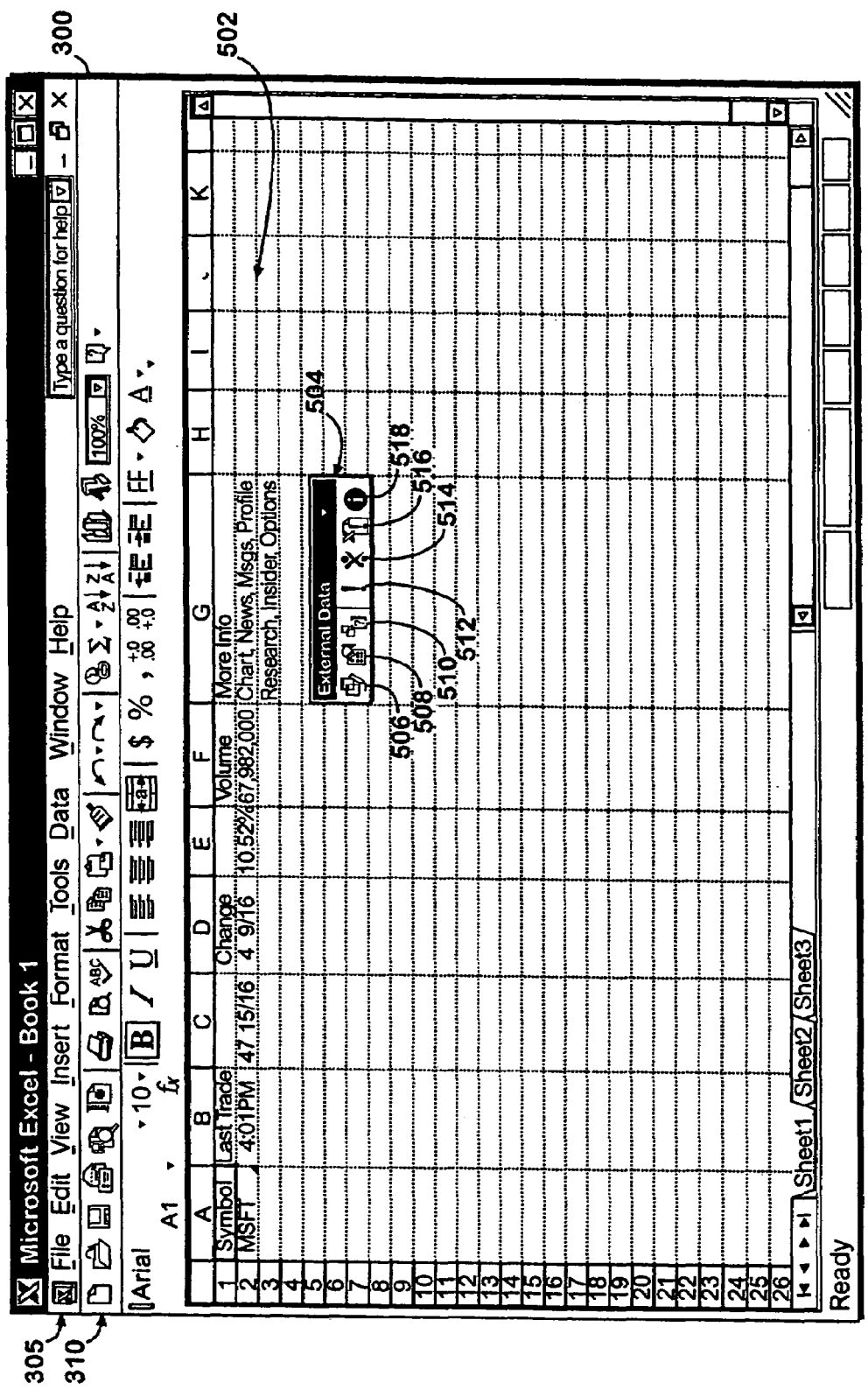
FIG. 5 is a screen display of a MICROSOFT EXCEL 2002 spreadsheet program worksheet after importing tabular data from a Web page.

FIG. 5 is an illustration of a screen display in the MICROSOFT EXCEL 2002 spreadsheet program illustrating the results of creating a refreshable Web Query in a MICROSOFT EXCEL 2002 worksheet. The MICROSOFT EXCEL 2002 window 300 shows the tabular data 502 imported within the cells displayed in the content window 315 (FIG. 3). An "External Data" menu box 506 is displayed adjacent to the tabular data 502 and contains an Edit Query button 506, a "Data Range Properties" button 508, a "Query Parameters" button 510, a "Refresh Data" button 512, a "Cancel Refresh" button 514, a "Refresh All" button 516, and a "Refresh Status" button 518. When the "Refresh Data" button 512 is selected, the tabular data 502 is automatically updated with any changes that occurred in the Web page that contains the tabular data.

Figure 6:
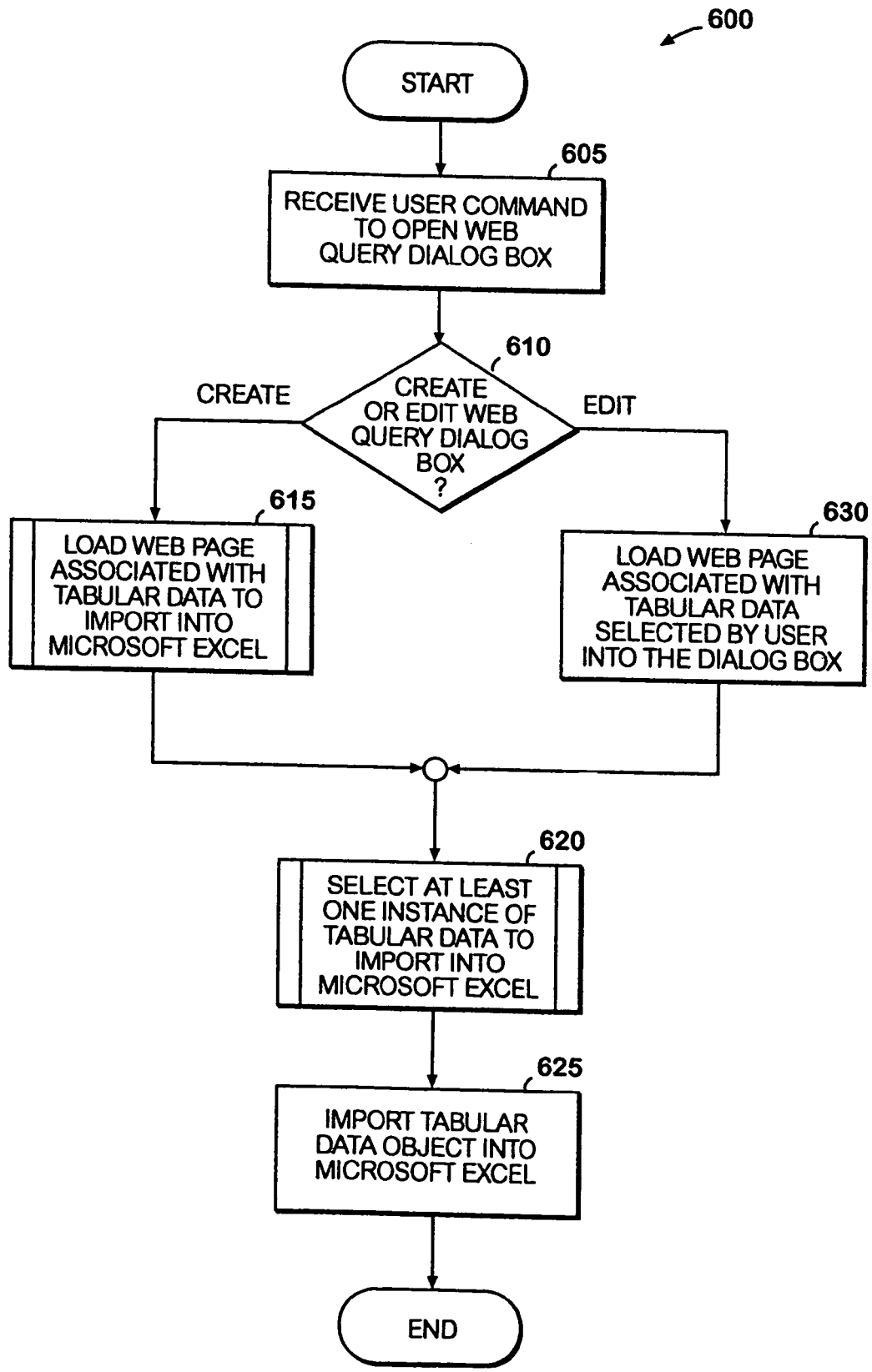
FIG. 6 is a logic flow diagram illustrating an exemplary technique for determining whether to create a new Web Query or edit an existing Web Query.

FIG. 6 is a logic flow diagram of routine 600 illustrating a method for importing tabular data from a Web page into a MICROSOFT EXCEL 2002 worksheet using a Web Query dialog box 320 (FIG. 3). Routine 600 begins at step 605, in which a user selects the command to open a New Web Query dialog box 320 (FIG. 3) from within the spreadsheet program. Step 605 is followed by step 610, in which the determination is made as to whether the user intended to create a new Web Query dialog box or open an existing Web Query dialog box. If the user selected to create a new Web Query dialog box 320, the "CREATE" branch is followed to step 615, in which an initial Web page is loaded in the New Web Query dialog box 320. The initial Web page may be any Web site that the user has set as their "home page" for their MICROSOFT EXCEL 2002 spreadsheet program. If for some reason, the user has not set a home page in their MICROSOFT EXCEL 2002 spreadsheet program, the home page for their MICROSOFT INTERNET EXPLORER browser program is used as the initial page in the Web Query dialog box. However, if the user does not have a "home page" associated within their MICROSOFT INTERNET EXPLORER browser program, the initial Web page displayed will be the Web site that is hard coded into the MICROSOFT EXCEL 2002 spreadsheet program. For example, the initial web page associated with the MICROSOFT EXCEL 2002 spreadsheet program stored in the registry location "Hkey_Current_User\Software\Microsoft\Office\10.0\Excel\Options\WebQueryHomePage" is loaded as the initial Web page in the Web Query dialog box. If for some reason this key does not exist, then the Web page will be the "home page" of the user's MICROSOFT INTERNET EXPLORER stored in the registry location "HKey_Current_User\Software\Microsoft\Internet Explorer\Main\Start Page." If, however, there is no URL stored in this registry location, a predetermined URL that is hard coded into the MICROSOFT EXCEL 2002 spreadsheet program is loaded into the Web Query dialog box as the initial home page. For instance, if the user does not have an initial Web page designated as their default home page for their MICROSOFT INTERNET EXPLORER browser program, the URL "http://www.msn.com," is initially loaded into the dialog box. Once the initial Web page is loaded into the dialog box, the user can freely navigate the Internet and load the Web page that contains the tabular data they want to import into their MICROSOFT EXCEL 2002 worksheet.

Step 615 is followed by step 620, in which the user graphically selects the tabular data from the Web page in the dialog box to import into the MICROSOFT EXCEL 2002 spreadsheet program. The user may use a pointing device, such as a mouse to position the cursor over the tabular data to select the data. Alternatively, the user may also use other pointing devices, such as the keyboard, stylus, light pen, or the like to select the tabular data. For example, the user may use the "TAB" key to move sequentially from one instance of tabular data to another instance of tabular data displayed in the Web page. Once the user has positioned the cursor over the tabular data that the user wants to import into their MICROSOFT EXCEL 2002 worksheet, the user then selects the data. Typically, the data is selected by clicking a predefined button on the mouse. However other methods of selecting the tabular data may be used, such as depressing the "ENTER" key on the keyboard or depressing the stylus. Although the current discussion has been directed towards selecting a single instance of data, it should be understood that multiple instances of tabular data within the Web page might be selected.

Next, step 620 is followed by step 625, in which the selected tabular data is imported into the MICROSOFT EXCEL 2002 worksheet as a Query table. Typically, the user selects the position within the MICROSOFT EXCEL 2002 worksheet where the Query table will be located by positioning the cursor over a cell proximate to the desired location and depressing a predefined mouse button or key. Finally, after the tabular data has been imported into the MICROSOFT EXCEL 2002 worksheet, step 625 is followed by the "END" step.

Returning to step 610, if however, the user did not chose to create a new Web but rather opened an existing Web Query, the "EDIT" branch is followed to step 630, in which the Web page associated with the existing Web Query is loaded into the Web Query dialog box. For example, if the user had previously created a Web Query, the user could open the existing Web Query by selecting the Query table in the spreadsheet program and invoking the EDIT command from the menu bar. Once the Web page is loaded into the Web Query dialog box, routine 600 proceeds to step 620, where the user graphically selects at least one instance of tabular data to edit or import into the spreadsheet program as a Web Query. The methods for selecting tabular data to import into an existing Web Query dialog box are identical to the methods for selecting tabular data to import into a New Web Query dialog box described above. Step 620 is then followed by step 625, in which the selected tabular data are imported into the MICROSOFT EXCEL 2002 worksheet. Finally, step 625 is followed by the "END" step.

Figure 7A:
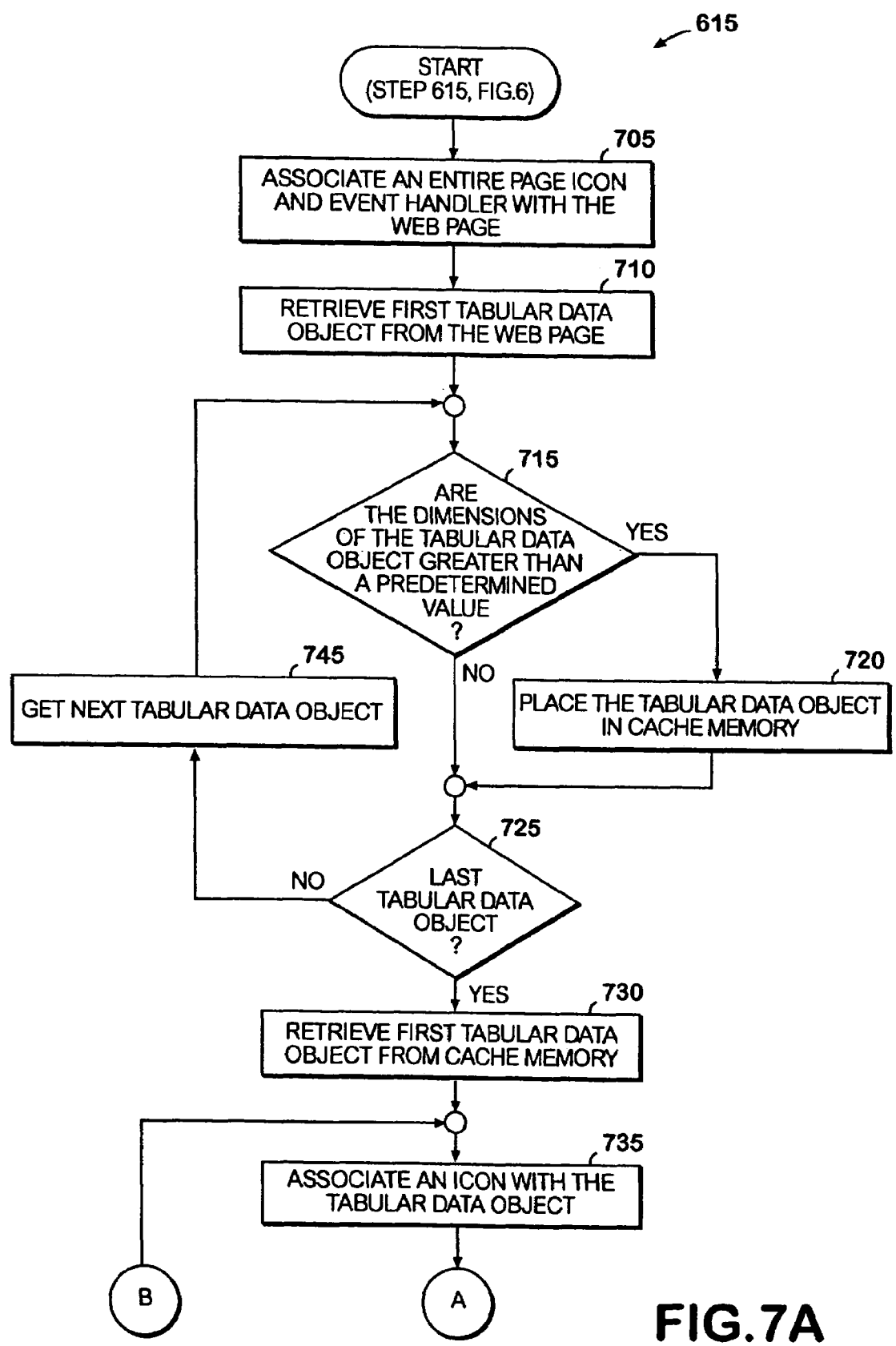
FIGS. 7A and 7B, hereinafter collectively referred to as FIG. 7, are a logic flow diagram illustrating an exemplary technique for graphically selecting tabular data from a Web page to import into the MICROSOFT EXCEL 2002 spreadsheet program as a Web Query.
Figure 7B:
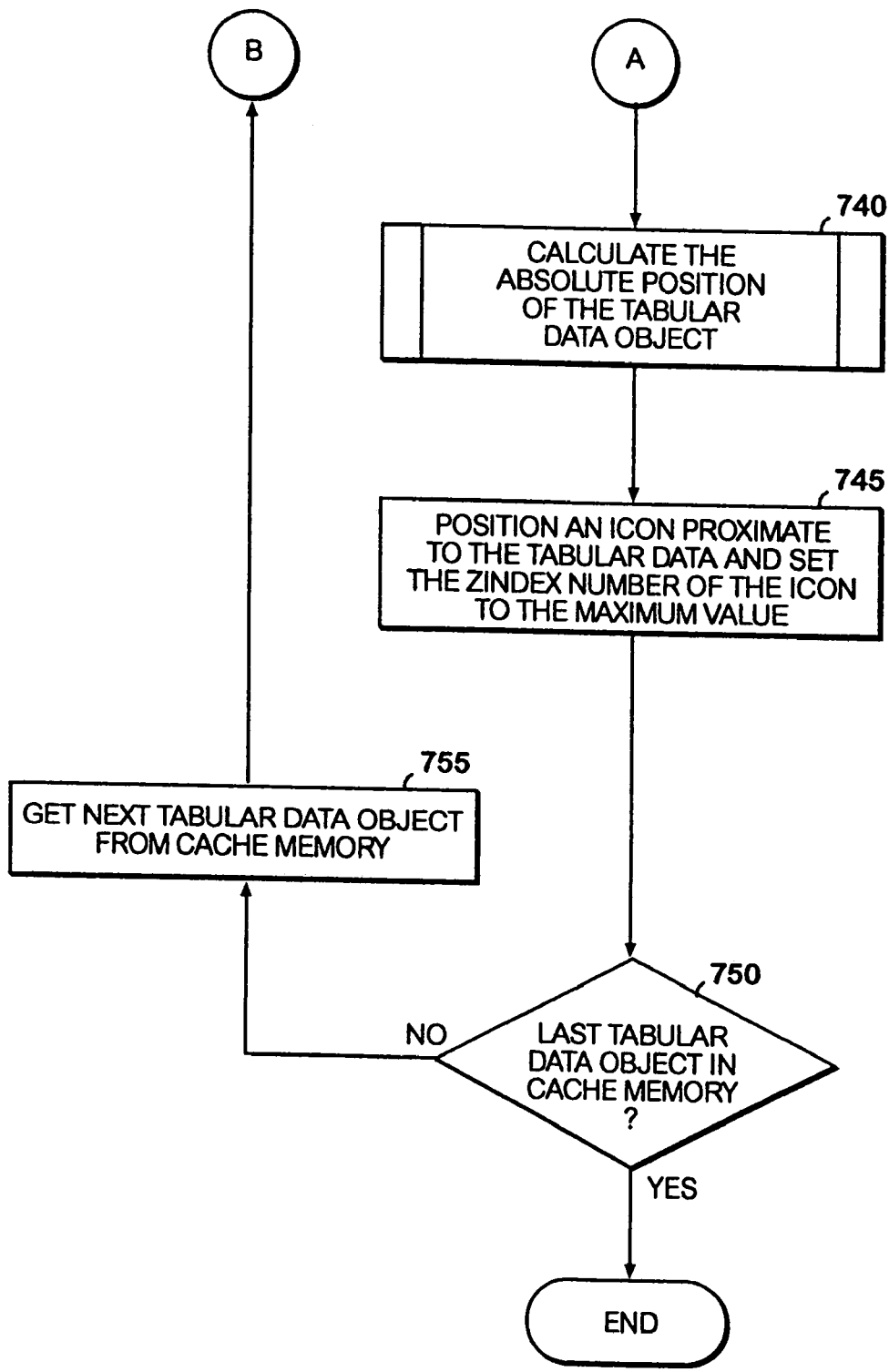

FIG. 7 is a logic flow diagram illustrating the routine 615 in FIG. 6, which loads the Web page into the Web Query dialog box. Routine 615 begins at step 705, in which an icon and an event handler are generated and associated with the entire Web page. Associating an icon with the entire Web page allows a user to import the whole Web page, rather than specific instances of tabular data into the spreadsheet program.

Next, step 705 is followed by step 710, in which the first tabular data object is retrieved from the document object model ("DOM"). Tabular data may be stored in a number of different objects in a Web page. Specifically, the DOM is scanned for TABLE, PRE, XMP, LISTING, and PLAINTEXT objects, all of which can store tabular data. When the first one of these objects is encountered, the position of the object in the Web page is noted. Any objects that do not contain tabular data, such as text, graphical files, video file, etc. are passed over. However, these objects may be nested in tabular data. Therefore, in those instances where non-tabular data is embedded within tabular data, non-tabular data may be imported into the Web Query.

Next, step 710 is followed by step 715 in which the determination is made whether the horizontal and vertical dimensions of the TABLE objects are greater than a predetermined value. Besides holding tabular data, the TABLE objects may be used as placeholders or spacers within the Web page layout. Indicating these TABLE objects to the user as instances of tabular data that could be imported into the spreadsheet program would complicate, rather than simplify the creation of a Web Query. If either the vertical or horizontal dimension of the TABLE object is less than a predefined value, the assumption is made that the object containing tabular data is being used as a placeholder. Therefore, those TABLE objects that are used as spaces are not counted as possible objects that may be imported as a Web Query. For the exemplary embodiment, the predefined value is eight (8) pixels for both the horizontal and vertical dimensions of the TABLE object. Eight pixels were chosen as the threshold value because the smallest text size that may be displayed on a Web page is typically 8 pixels. Therefore, any object whose width or height is smaller than eight pixels is likely to be a spacer. Although eight pixels is set as the threshold value, those skilled in the art will appreciate that any number of pixels may be chosen as the threshold value for determining whether a TABLE tag is a merely a spacer without altering the scope of the invention.

If the determination is made that both the horizontal and vertical dimensions are greater than the predefined value, then the "YES" branch is followed to step 720, in which the tabular data object and its position in the DOM are stored in a cache memory location.

Next, step 720 is followed by step 725, in which the determination is made whether the last tabular data object in the DOM has been retrieved. If the last tabular data object has been retrieved from the DOM, then the "YES" branch is followed to step 730, in which the first tabular data stored placed in the cache memory is retrieved from the cache memory.

Step 730 is then followed by step 735, in which an icon is generated and associated with the tabular data. The icons have at least one visual attribute to make them easier for the user to see. For example, the visual attribute may be a color, a text character, a special character, a graphical object, or the like. In the exemplary embodiment, each icon consists of a right pointing arrow contained within a yellow box with a black border. Once the icons are created, they are placed on the highest layer in the HTML document to insure that they are always visible to the user. Specifically, the zIndex value, which is associated with every object in the HTML document and designates which layer of the HTML document the object will appear, is set to the maximum value, defined as "maxint." Setting the zIndex value to the maximum value, "maxint," places the icons in the top-most layer of the HTML document. Thus, the icons will always be visible to the user within the Web Query dialog box.

Step 735 is followed by step 740, in which the absolute position of each object containing tabular data is calculated. Typically, objects in an HTML document are defined by a parent-child hierarchical relationship with the position of the child object given as an offset value in relation to the parent object. Each parent object is defined by an offset value relative to the <BODY> tag of the HTML document. However, it should be noted that parent objects might at the same time also be child objects. In these instances, the position of a tabular data object that is both a parent and a child object is calculated relative to its own parent object. Only when a parent object is itself not a child object is its position given as an offset value from the <BODY> tag.

Next, step 740 is followed by step 745, in which each icon is positioned proximate to each object containing tabular data. In the exemplary embodiment, the icons are placed proximate to the upper left corner of the corresponding object that contains tabular data. Those skilled in the art however, will appreciate that the icons may be placed at other locations that are proximate to the object, such as adjacent to the any one of the other three corners, adjacent to the top, bottom, or sides, etc. without altering the scope of the invention. Positioning the icons proximate to the objects presents the tabular data to the user in a more pleasing and user-friendly manner without cluttering the Web page displayed in the Web Query dialog box.

Finally, step 745 is followed by step 750, in which the determination is made as to whether the last data object in the cache memory has been reached. If the last tabular data object in the cache memory has been reached, the "YES" branch is followed to the "END" step. However, if the last tabular object in the Web page has not been reached, the "NO" branch is followed to step 755, where the next tabular data object stored in the cache memory is retrieved. Step 755 then loops back to step 735, in which the process of adding an icon proximate to the tabular data object is repeated.

Returning to step 715, if the determination is made that either the horizontal or vertical dimension of the TABLE object is less than the predetermined value, then it is determined that the TABLE object contains no meaningful data and the "NO" branch is followed directly to step 725, in which the determination is made whether the last tabular data object in the DOM has been reached. If the last tabular data object in the DOM has been reached, then the "YES" branch is followed to step 730, in which the process of associating an icon with each instance of tabular data stored in the cache memory is started. However, if the determination is made that the last instance of tabular data in the DOM was not reached, then the "NO" branch is followed to step 745, where the next instance of tabular data in the DOM is retrieved and the process of inserting the icons in the Web page is repeated.

Figure 8:
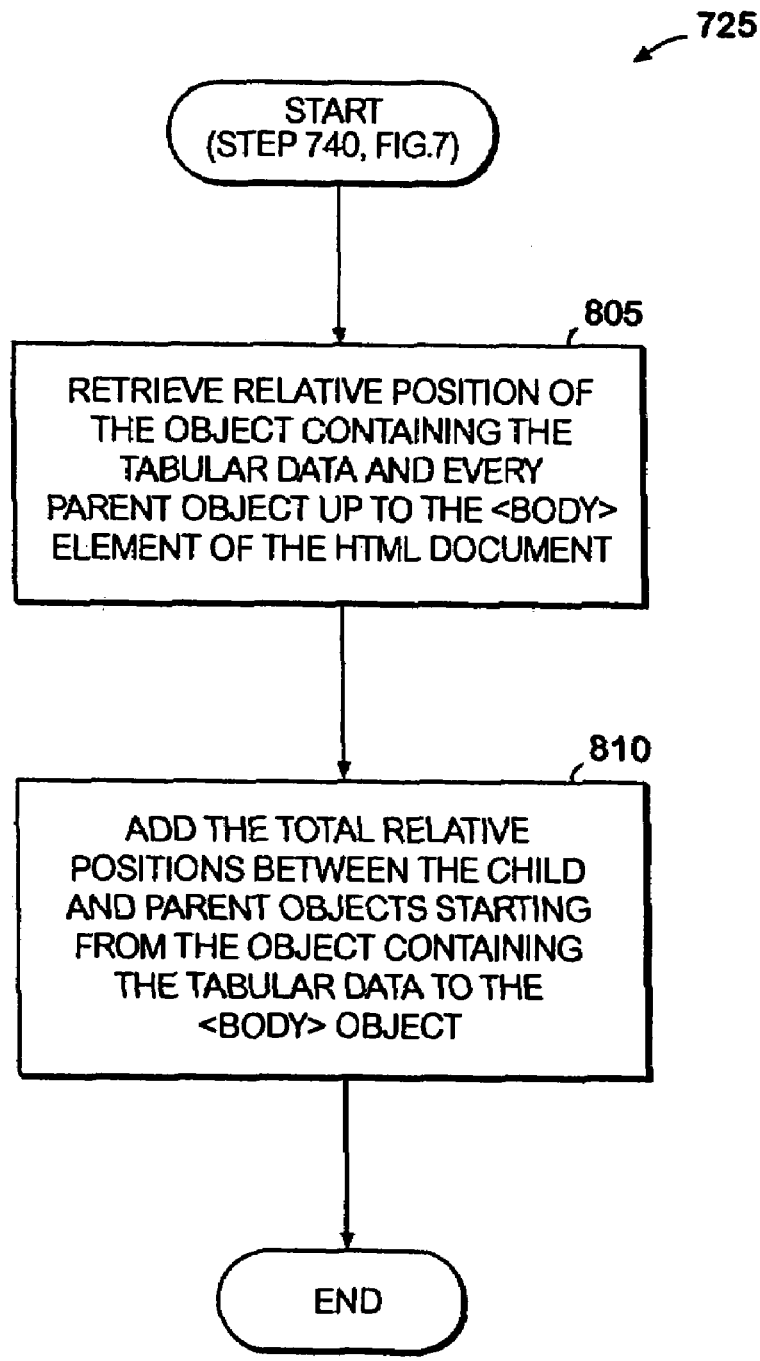
FIG. 8 is a logic flow diagram illustrating an exemplary technique for calculating the absolute position of the tabular data on the Web page to create a Web Query.

FIG. 8 is a logical flow diagram illustrating routine 740 from FIG. 7, in which the absolute position of each of the objects that contain tabular data is calculated. Routine 740 begins at step 805 in which the value that defines relative position of the upper left most corner of the object containing tabular data is retrieved from the DOM. Typically, in an HTML document, the objects are set up in a parent-child hierarchical relationship. Each parent object in the hierarchical relationship can have multiple child objects. Additionally, each child object may itself be a parent object and have multiple child objects. The top-most, or highest parent object in the HTML document is the <BODY> element. The position of each object that is a child of the <BODY> element is given a value that is relative to the absolute position of the <BODY> element. The position of each subsequent child element is given by values that are relative to its parent object. In other words, the position of each object in the HTML document is given as an offset relative to its parent. It should be noted that the position of each instance of tabular data within the Web Query dialog box is dependent upon the size of the Web Query dialog box. Because dialog boxes, in general, may be resized, the position of the objects within the dialog box can change when the Web Query dialog box is resized. Therefore, each time the Web Query dialog box is resized, the position of each instance of tabular data must also be recalculated.

Step 805 is followed by step 810, in which the relative positions between child and parent objects are added together starting from the object of interest all the way back to the highest parent object, which is the <BODY> tag of the HTML document. For example, if the tabular data is contained in a <TABLE> tag that is a child object of the <BODY> tag, then the position of the <TABLE> tag is simply given by the offset value. As another example, if the tabular data is contained in a <TABLE> tag that is a child of a <PLAINTEXT> tag, which is itself a child of the <BODY> tag, then the position of the <TABLE> tag is calculated by adding the offset value of the <TABLE> tag and the offset value of the <PLAINTEXT> tag. In this manner, the absolute position of the object containing the tabular data is calculated. Finally, step 810 is followed by the "END" step.

Figure 9:
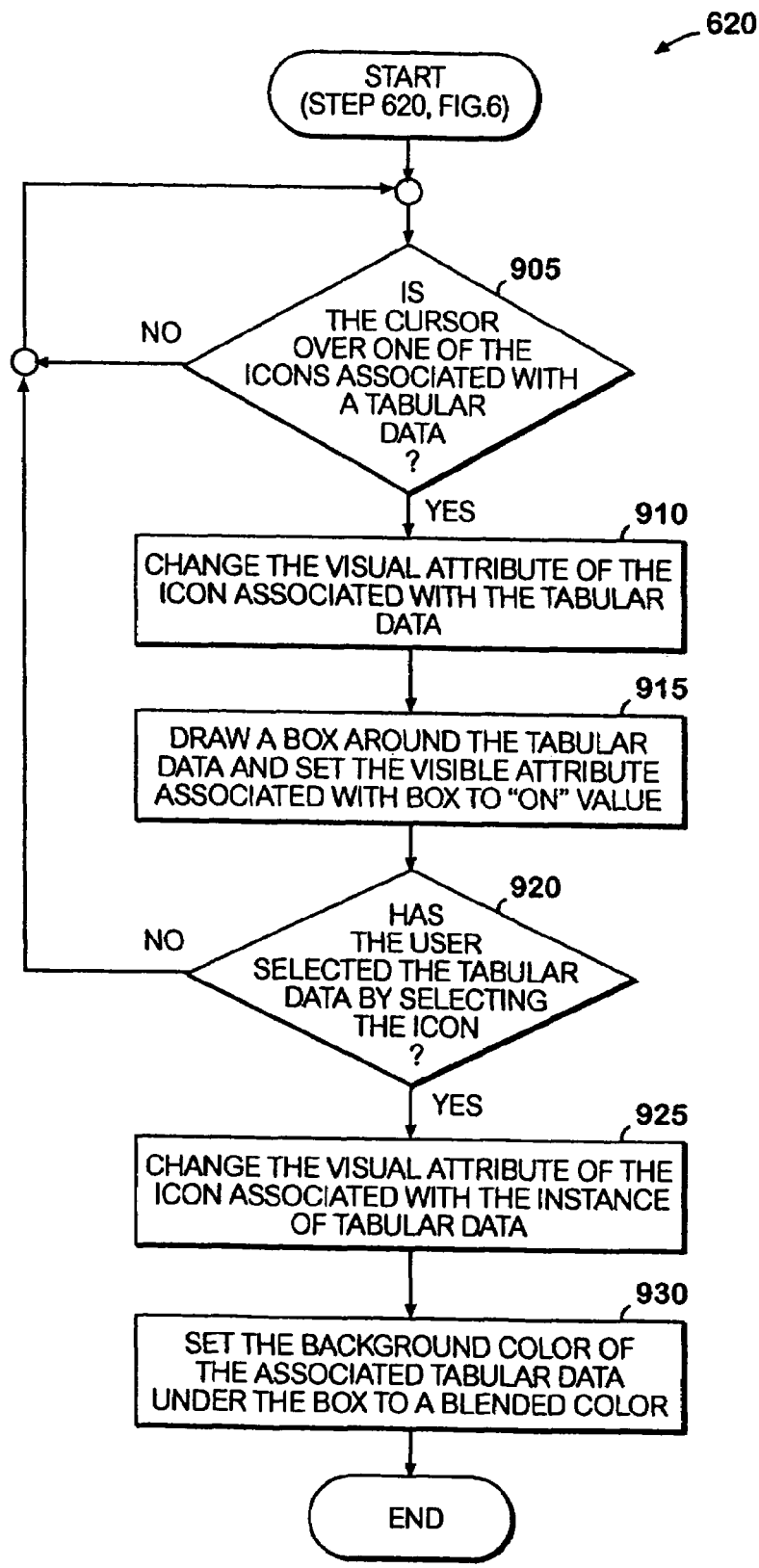
FIG. 9 is a logic flow diagram illustrating an exemplary technique for graphically selecting an instance of tabular data to create a Web Query.

FIG. 9 is a logic flow diagram illustrating routine 620, in which the user selects an object containing tabular data to import into the application program. Routine 620 begins at step 905, in which the determination is made as to whether the user has positioned the cursor over one of the icons associated with an instance of tabular data.. If the user has positioned the cursor over one of the icons, the "YES" branch is followed to step 910, in which the visual attribute of the icon is altered. For example, in the exemplary embodiment, the visual attribute of the icon is the background color, which is set to the color yellow. However, when the cursor is hovering over the icon, which is also known as a "mouseover" event, the background color changes from yellow to green. This provides a visual feedback to the user that they may select the tabular data associated with that particular icon.

Step 910 is followed by step 915, in which a box is placed over the object containing the tabular data. The box is stored in a "blank.gif" image and comprises a background attribute and a border attribute. The border attribute is set to the value of the system high light color. The background attribute is blank, or "transparent." Therefore, any tabular data or text that lies underneath the box is visible on the display to the user. The box is placed on the third layer in the Web page by setting the zIndex associated with the box to the maximum number of layers allowed, which is given by the value "maxint" minus 2 (maxint−2). Placing the box below the maximum layer in the HTML document insures that "flickering" will not occur on the display when the highlight image is displayed. "Flicker" would occur if the zIndex value of the highlighted image were higher than the zIndex value of the icon, so that it would be on top of the icon and cause the icon to receive a "mouseover" event, which in turn would obscure the icon. However, the mouseover event would stop when the icon is obscured. This would trigger the highlighted image to disappear, but when it does, the mouseover event would fire again even though the mouse has not moved. This cycle of repeatedly firing a mouseover event is what causes "flicker."

Step 915 is followed by step 920, in which the determination is made as to whether the user has selected the object to import into the spreadsheet program by determining whether an "on click" event has occurred over an instance of tabular data. If an "on click" event has occurred, the "YES" branch is followed to step 925, in which the visual attribute of the icon is altered again. For example, when an "on-click" event occurs, the icon associated with the tabular data changes from a right facing arrow to a checkmark on a green background. Next, step 925 is followed by step 930 where the background attribute of the object containing tabular data is altered. Specifically, the background attribute of the object is changed from its original color to a blended color consisting of the system high light color and white. The original background attribute of the object is stored in memory so that if the user deselects the object containing the tabular data, the original background color can be restored. Changing the visual attribute of the icon and the background attribute provides the user with a visual confirmation that the tabular data has been selected and ready to be imported into the spreadsheet program.

Additionally, some Web pages contain more material than can be displayed on one page. Subsequently, some Web pages may have multiple pages or frames. When a Web page contains multiple frames, all the frames are scanned for tabular data, for which icons are created and associated with. Additionally, each frame has its own window and URL so that the frame's URL instead of the Web page's URL must be used when creating the Web Query. Furthermore, if an instance of tabular data has previously been selected on another frame, that instance of tabular data is deselected when a new instance of tabular data is selected on another frame. Thus only multiple tables within the same frame may be selected and imported at the same time. Furthermore, when the user subsequently refreshes the tabular data, only the frame containing the selected tabular data, and not the entire Web page is loaded into the Web Query. It should be noted that importing tabular data from a single frame is a limitation of the MICROSOFT EXCEL 2002 spreadsheet program and not the Web Query Dialog. To the contrary, the Web Query Dialog is capable of allowing the user to select and import tables from multiple frames. Therefore, the restriction of importing table from a single frame arises out of the MICROSOFT EXCEL 2002 spreadsheet program's inability to transfer data between multiple frames.

Refreshable Web Query

The present invention may be embodied in a software utility, which may be referred to as the "Web Query Smart Tag" (WQST). An embodiment of this utility will be incorporated into the MICROSOFT EXCEL 2002 and INTERNET EXPLORER 5.0 software programs. The WQST utility allows users to more easily create refreshable Web queries. The term "software utility" typically denotes a software function, routine, or dynamic link library (DLL) that is configured as an independent object or module accessible by other software modules through a pre-defined set of interfaces. However, a "utility" within the meaning of this specification may also be incorporated into a computer operating system or application program, such as a Web development application program. The invention therefore, encompasses any type of software module or system that performs the methods of the WQST utility described in this specification, and is not limited to a particular object configuration, such as a dynamic link library (DLL). In addition, although the present invention is described in the context of a spreadsheet program, those skilled in the art will appreciate that the invention is applicable to other programs that allow a user to import tabular data from a Web page, such as dedicated Web authoring tools, word processing programs, presentation programs, drawing programs, and the like.

The WQST utility allows a user to create refreshable Web queries directly from a Web browser program using one of several methods. The first method, known as the "Copy-Paste Web Query" method allows a user to copy tabular data displayed in a Web page open in an Internet browser module and import the tabular data into a spreadsheet application by invoking the Copy-Paste command. Another method, known as "Edit with Microsoft Excel," allows a user to select tabular data in a Web page by depressing the right mouse button while the cursor is positioned in the Web browser program to display a drop down context menu. The context menu in turn, provides the user with an option to export the tabular data to the MICROSOFT EXCEL 2002 spreadsheet program.

The final method, known as "Edit with Microsoft Excel," is an option present in the MICROSOFT INTERNET EXPLORER Web browser program that when selected, launches the MICROSOFT EXCEL 2002 spreadsheet program. To access this option, the user opens the Web page in the MICROSOFT INTERNET EXPLORER Web browser program and chooses the "Edit with Microsoft Excel" option from a drop down menu on the Toolbar. If the Web page was created with the MICROSOFT EXCEL 2002 spreadsheet program, the file is opened using the MICROSOFT EXCEL 2002 spreadsheet program. However, if the Web page was created with another program, the entire Web page is imported into a Web Query dialog box and the user may then select the tabular data they wish to import into the spreadsheet program.

Typically, the block of data that the user wishes to copy from the Web page to the spreadsheet program is tabular in nature. This is due to the fact that spreadsheet programs are specifically designed to manipulate tabular data. However, spreadsheet programs may manipulate other types of data, such as text or graphics. Therefore, although for purposes of this application, the WQST utility is described in terms of manipulating tabular data, those skilled in the art will appreciate that a refreshable Web Query may be created using other forms of data, such as text, graphic, or the like without departing from the scope of invention. Each of the three methods is discussed in detail below.

Copy-Paste Web Queries

The first method of generating a Web Query using the WQST utility is a software module known as "Copy-Paste Web Query." The Copy-Paste Web Query module presents an option on the Paste Recovery on-object user interface (OOUI), or Smart Tag called "Create Refreshable Web Query." The Paste Recovery Smart Tag is a drop-down menu that appears next to the block of data that the user has pasted into an electronic file, namely a MICROSOFT EXCEL 2002 workbook. The user may select the Paste Recovery Smart Tag to display several different variations of how the data may be pasted into the file. For example, the user may choose to paste the data as text or an HTML without having to undo and use the Paste Special command.

The Copy-Paste Web Query module is activated when the user selects tabular data using a pointing device, such as a mouse, to copy from a Web page open in an Internet browser module and invokes the Paste command in the MICROSOFT EXCEL 2002 spreadsheet program. Once the user pastes the tabular data into the MICROSOFT EXCEL 2002 spreadsheet program, the Copy-Paste Web Query module checks the data format of the tabular data selected by the user to determine if it is a predefined data format, specifically, CF_HTML. The CF_HTML format is a data format that is used to transfer data between applications via the Clipboard. Although the Copy-Paste Web Query module uses the CF_HTML format, those skilled in the art will appreciate that other formats, which facilitate the transfer of data between applications, may be used without altering the scope of the invention.

If both these conditions are met, namely the Paste command has been invoked and the format of the data on the Clipboard is CF_HTML, then the Copy-Paste Web Query module is enabled. The Copy-Paste Web Query module first determines whether a first identifier tag in the registry associated with the tabular data has been set to a predefined value to disable the Refreshable Web Query option on the Smart Tag. Specifically, the registry key "Hkey_Current_User\Software\ Microsoft\Office\10.0\Excel\Options\Disable PasteAsWebQuery" is examined to determine if it contains a predetermined value. If the registry key is contains the predetermined value to disabled the Web Query, the option to create a Refreshable Web Query is not presented to the user on the Smart Tag and the tabular data is pasted into the MICROSOFT EXCEL 2002 spreadsheet program in the usual manner.

However, if the Administrative Registry Key is not disabled, then the Copy-Paste Web Query module determines whether a second identifier tag in the registry, has been set to one of several predefined values. Specifically, the Copy-Paste Web Query determines whether a flag associated with the tabular data that is used to identify the application used to create the tabular data is set to one of several predefined values. Namely, the Copy-Paste Web Query module is checking META tags to determine whether the MICROSOFT EXCEL 2002 spreadsheet program, or any other MICROSOFT OFFICE XP application, such as the MICROSOFT WORD, MICROSOFT PUBLISHER, MICROSOFT ACCESS, MICROSOFT POWERPOINT, or MICROSOFT FRONTPAGE programs were used to create the tabular data. Specifically, the Copy-Paste Web Query module checks the "ProgID" META tag inside the header of the CF_HTML, which specified the application program source. If this tag is enabled, it indicates that the MICROSOFT EXCEL 2002 spreadsheet program, or another MICROSOFT OFFICE XP application program was used to create the tabular data, which is then pasted into the spreadsheet program in the normal manner without creating a Web Query.

If, however, the Copy-Paste Web Query module determines that the tabular data was not copied from a MICROSOFT OFFICE XP application program, then Copy-Paste Web Query module makes yet another determination, namely whether the SourceURL string associated with the tabular data in the CF_HTML contains a well formed URL. That is, the Copy-Paste Web Query module checks the SourceURL string to determine if it contains one of the following values: "http://", "https://", "htp://", or "file://" at the beginning of the URL. If one of these SourceURL strings is present, it indicates that the tabular data is associated with a valid URL, which may be accessed later to update the tabular data. If the SourceURL string is not well formed, then the Copy-Paste Web Query module does not present the option to create a refreshable Web Query to the user and the tabular data is pasted into the spreadsheet program in the usual manner. However, if the URL associated with the tabular data is well formed, then the Copy-Paste Web Query module pastes the tabular data into the spreadsheet program and displays the Create Refreshable Web Query" option on the Paste Recovery Smart Tag to create a refreshable Web Query.

Once the user opens the Paste Recovery Smart Tag, the user may select the "Create Refreshable Web Query" option. A Web Query dialog box, called the "New Web Query" dialog box, is opened in the spreadsheet program. The Web Query dialog box contains the Internet browser module that is pre-navigated to the same SourceURL specified in the CF_HTML. The user then reselects the same tabular data he or she wants to import into the spreadsheet program. Alternatively, the user may reselect the tabular data by highlighting the icon associated with the tabular data and invoking the Import command. The Copy-Paste Web Query module then creates a link between the tabular data in the Web page and the tabular data pasted in the spreadsheet. The link allows the user to automatically update the tabular data in the spreadsheet program by choosing a Refresh command from the Data menu.

FIGS. 10 through 14 illustrate the process of creating a Web Query using the Copy-Paste Web Query module.

Figure 10:
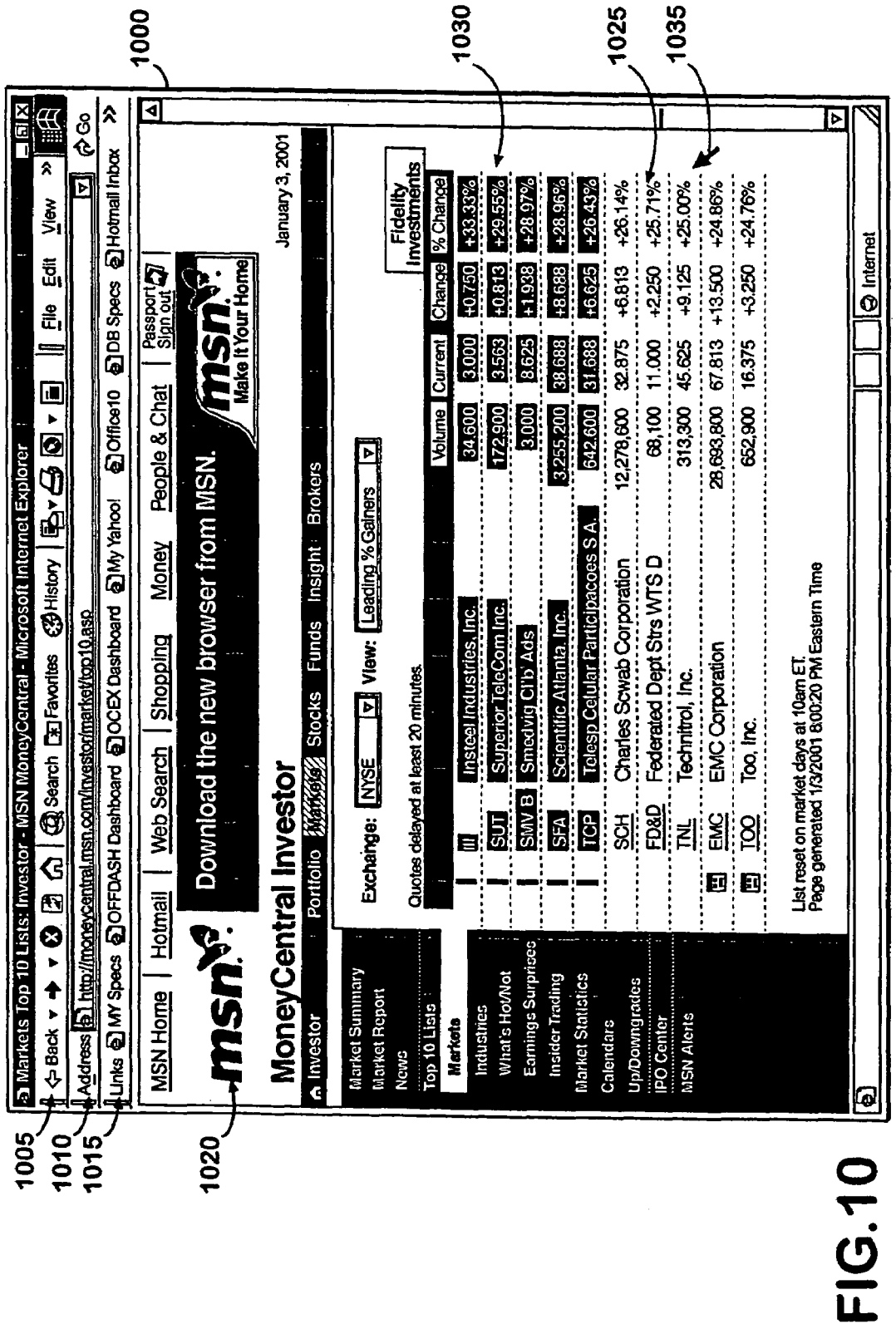
FIG. 10 is a screen display illustrating the selection of a tabular data in a Web page open in an Internet browser module.

FIG. 10 is an illustration of the result of selecting tabular data from Web page displayed in an INTERNET EXPLORER window 1000. The INTERNET EXPLORER window 1000 includes a drop-down menu bar 1005, a command bar 1010, and an address bar 1015. The contents of the Web page are viewed in the viewing area 1020. In the illustration, the viewing area 1020 contains tabular data 1025, of which a subset 1030 has been selected to be imported into a MICROSOFT EXCEL 2002 worksheet as a Web query using a pointing device 1035. Although the present illustration only shows a subset of the tabular data being selected, those skilled in the art will appreciate that the entire tabular data 1020 might also be selected to be pasted into the MICROSOFT EXCEL 2002 worksheet.

Figure 11:
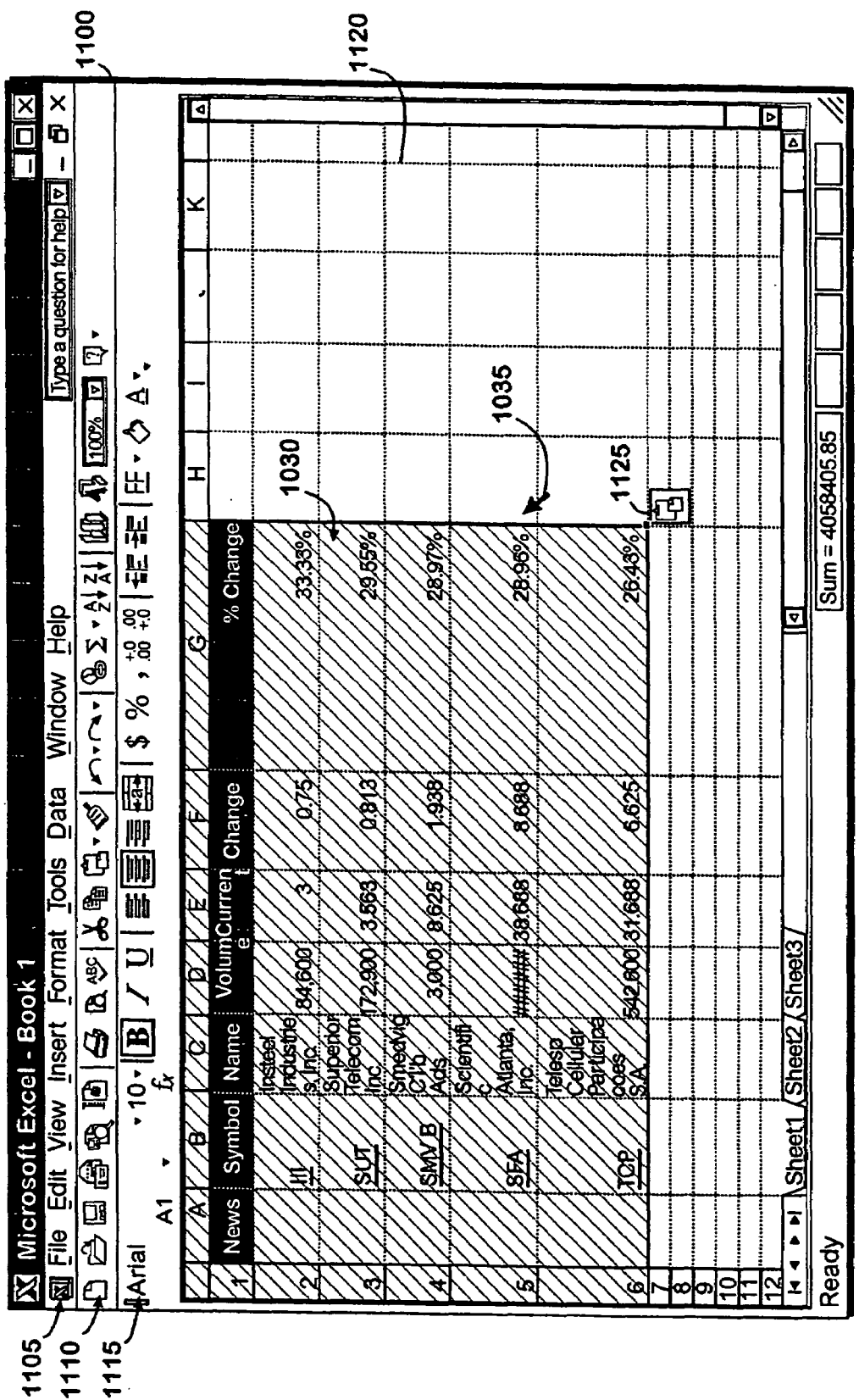
FIG. 11 is a screen display of the tabular data selected in the Web page being pasted into a MICROSOFT EXCEL 2002 spreadsheet program worksheet.

FIG. 11 is an illustration of a MICROSOFT EXCEL 2002 window 1100 illustrating how the subset 1030 of the tabular data 1025 would appear after it has been pasted into the MICROSOFT EXCEL 2002 worksheet. The MICROSOFT EXCEL 2002 window 1100 includes a drop-down menu bar 1105 and a series of command bars 110, 1115. The contents of MICROSOFT EXCEL 2002 worksheet are viewed in the viewing area 1120, which typically consists of a number of cells arranged in tabular form. The window 1100 also contains the pointing device 1035 (FIG. 10). In the illustration, the subset 1025 of the tabular data 1020 displayed in FIG. 10 is shown after it has been pasted into the viewing area 1110 of the window 1100. The viewing area 1120 also contains a drop-down menu icon, known as a Paste Recovery Smart Tag 1125. The Paste Recovery Smart Tag 1115 appears proximate to the subset 1025 of the tabular data 1020, or any other tabular data that is pasted into the spreadsheet program. The Paste Recovery Smart Tag 1125 is a drop-down menu that allows the user to select one of several different variations of how the data may be pasted into the file. For example, the user may choose to paste the data as text or HTML without having to undo and invoke the Paste Special command. The subset of tabular data 1030 appears "shaded" or "grayed" until the data has been pasted using one of the Paste variations from the Smart Tag 1125.

Figure 12:
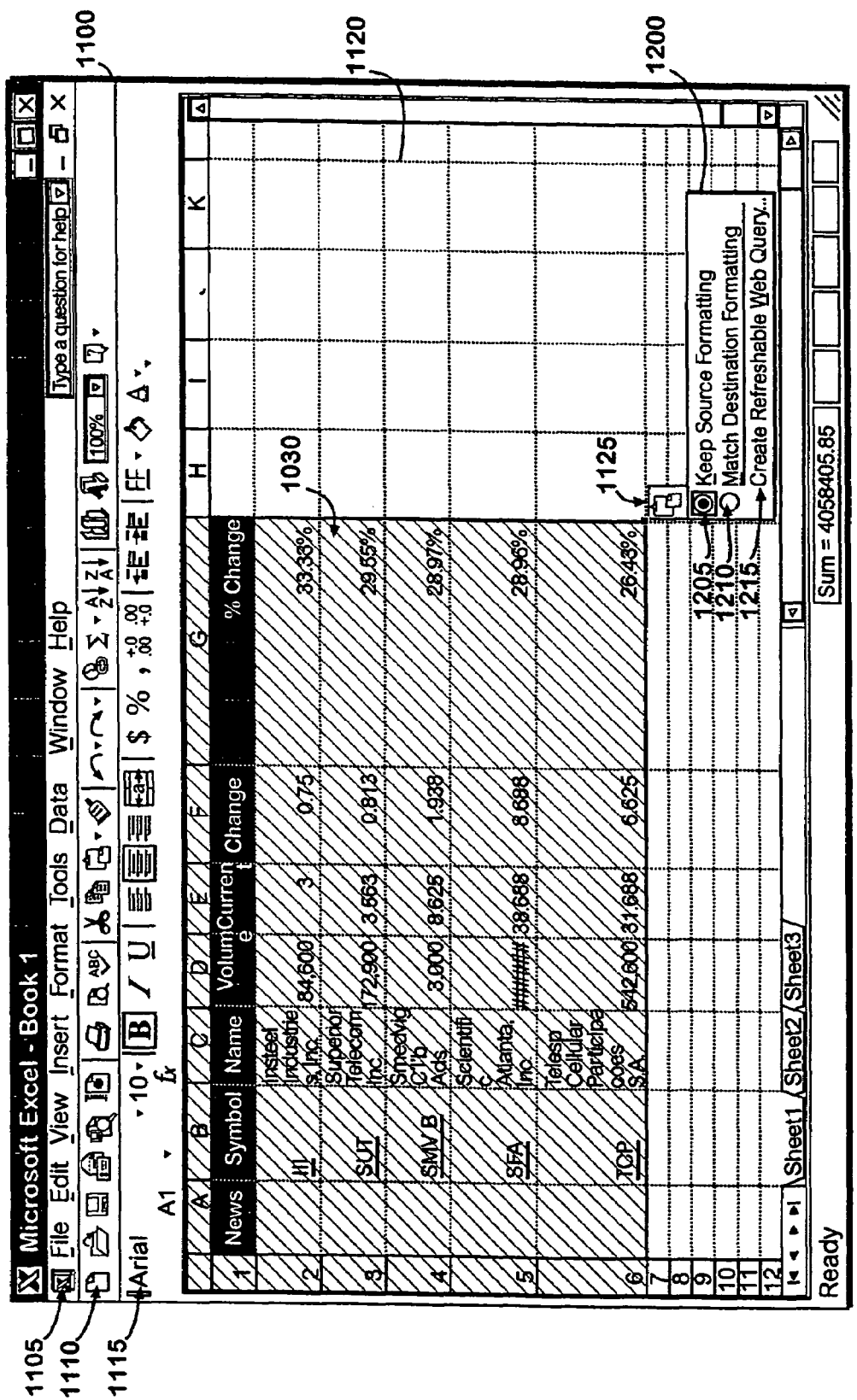
FIG. 12 is screen display illustrating the option to create a Web Query displayed to the user in a drop-down menu.

FIG. 12 is an illustration of a screen display in the MICROSOFT EXCEL 2002 spreadsheet program illustrating the result of a user invoking the Paste Recovery Smart Tag 1125. When the Paste Recovery Smart Tag 1125 is invoked, a Paste-Recovery Smart Tag drop-down menu 1200 appears showing a list of variations of the Paste command. For example, in the illustration, the Paste Recovery Smart Tag drop-down menu 1200 show a "Keep Source Formatting" command 1205, a "Math Destination Formatting" command 1210, and a "Create Refreshable Web Query . . . " command 1215, which was added by the Copy-Paste Web Query module and allows the user to create a Web Query when importing data from a Web page.

Figure 13:
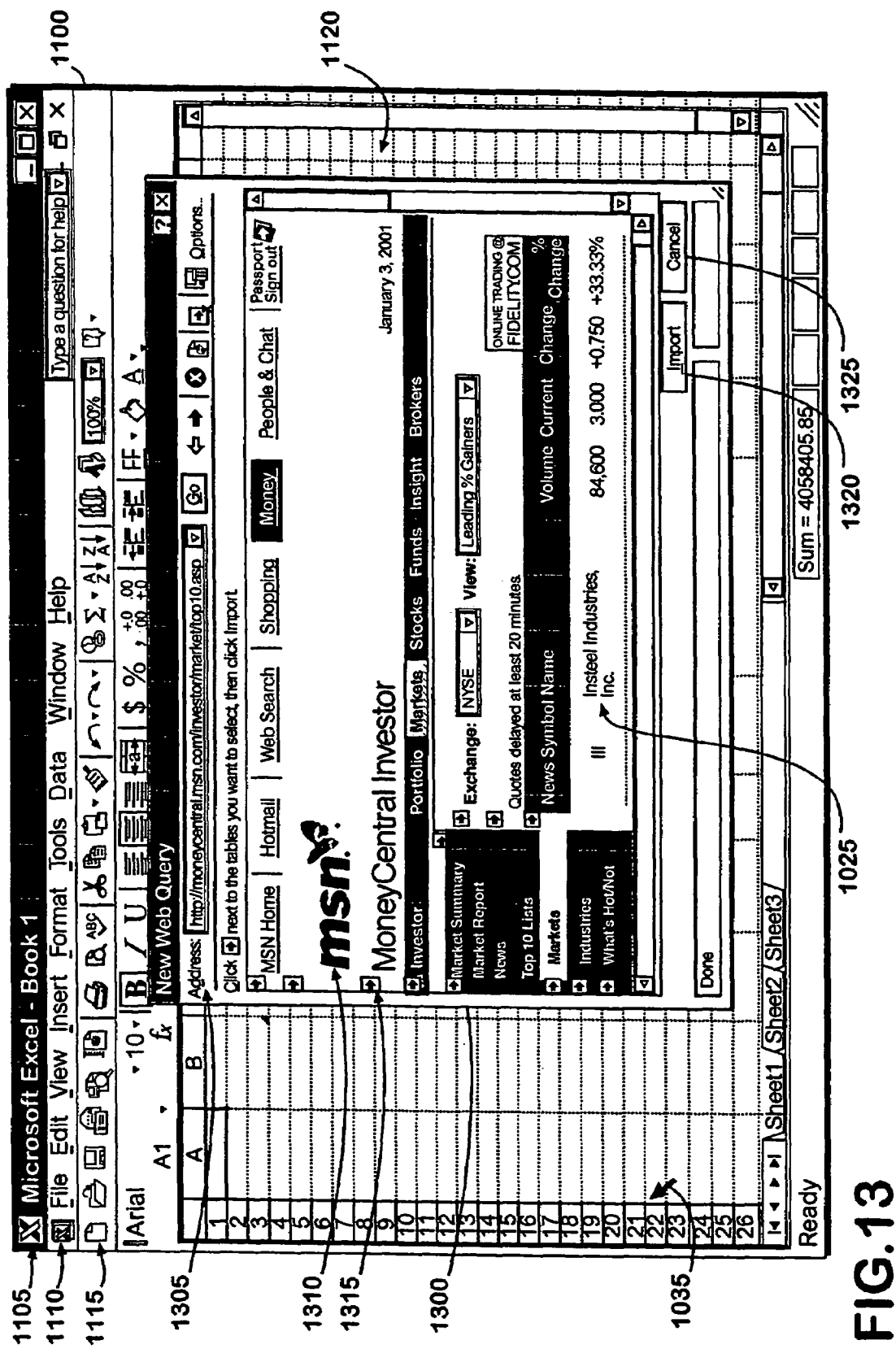
FIG. 13 is a screen display of a Web Query dialog box open in the MICROSOFT EXCEL 2002 spreadsheet program illustrating the Web page containing the selected tabular data.

FIG. 13 is an illustration of a screen display in the MICROSOFT EXCEL 2002 spreadsheet program illustrating the result of a user selecting the "Create Refreshable Web Query . . . " command 1215 displayed in the Paste Recovery Smart Tag drop-down 1125 (FIG. 11). The Copy-Paste Web Query module opens a Web Query dialog box 1300 within the spreadsheet program window 1100. The Web Query dialog box 1300 contains an address bar 1305 that displays the URL of the Web page currently being viewed and a content window 1310 that displays the contents of the Web page previously open in the Internet browser window 1000 (FIG. 10). The content window 1310 contains the tabular data 1020 (FIG. 10) previously selected. The Web Query dialog box also contains a number of icons 1315 associated with the tabular data inserted into the Web page by the Web Query, as described above. The user may select one or more of these icons associated with the tabular data and then invokes the Import command by using a pointing device to select the Import button 1315 or using the keyboard. This creates the refreshable Web Query between the tabular data in the Web page and the tabular data 1020 pasted in the content widow 1120 of the MICROSOFT EXCEL 2002 worksheet.

Figure 14:
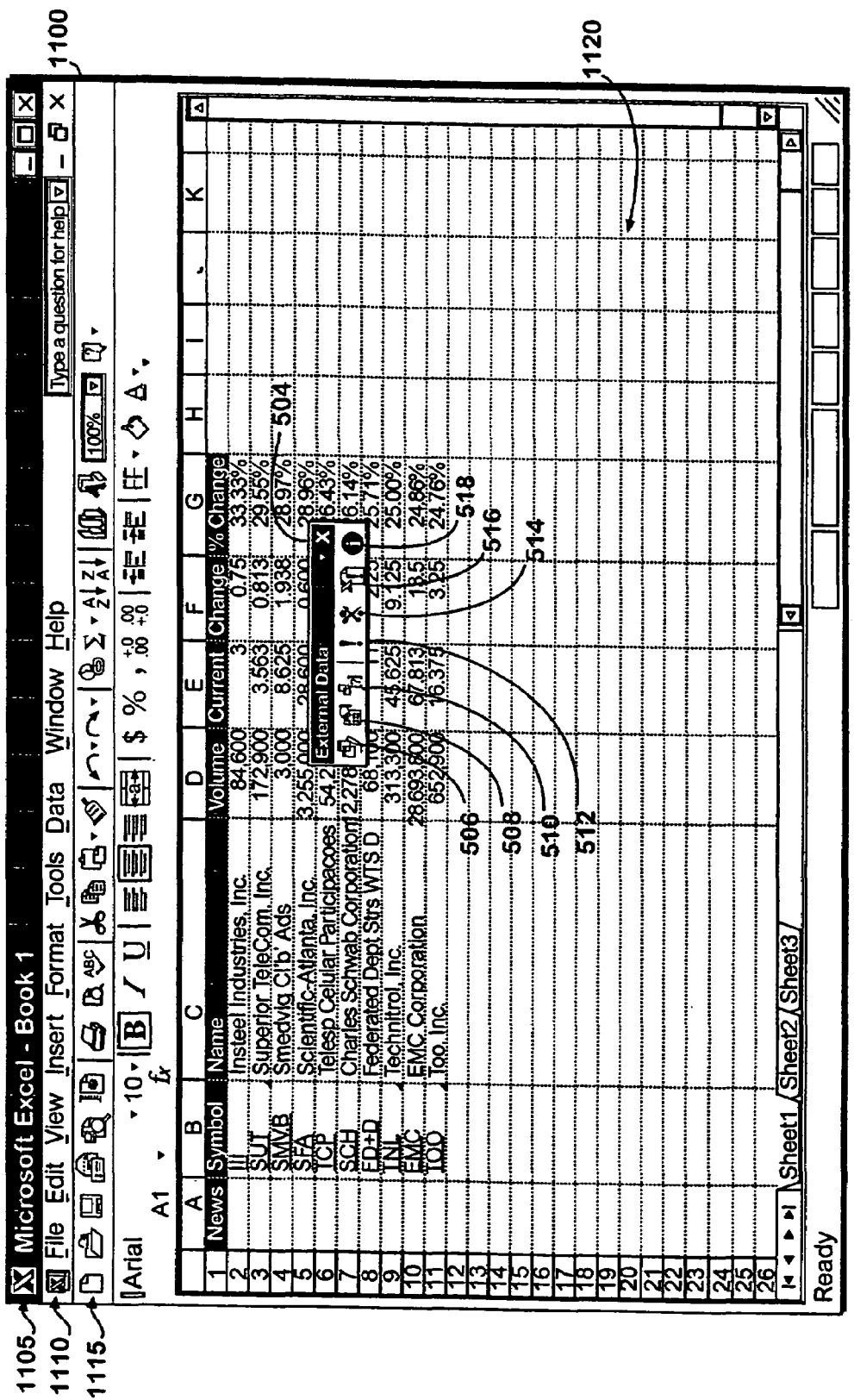
FIG. 14 is a screen display illustrating the results of importing data into a MICROSOFT EXCEL 2002 worksheet as a refreshable Web Query.

FIG. 14 is an illustration of a screen display in MICROSOFT EXCEL 2002 window 1100 (FIG. 11) illustrating the results of creating a refreshable Web Query 1400. The MICROSOFT EXCEL 2002 window 1100 shows the tabular data 1030 (FIG. 10) imported within the cells displayed in the content window 1120 (FIG. 1). An "External Data" menu box 506 (FIG. 5) is displayed adjacent to the tabular data 1030 and contains an Edit Query button 506, a "Data Range Properties" button 508, a "Query Parameters" button 510, a "Refresh Data" button 512, a "Cancel Refresh" button 514, a "Refresh All" button 516, and a "Refresh Status" button 518. When the "Refresh Data" button 512 is selected, the tabular data 502 is automatically updated with any changes that occurred in the Web page that contains the tabular data.

Figure 15A:
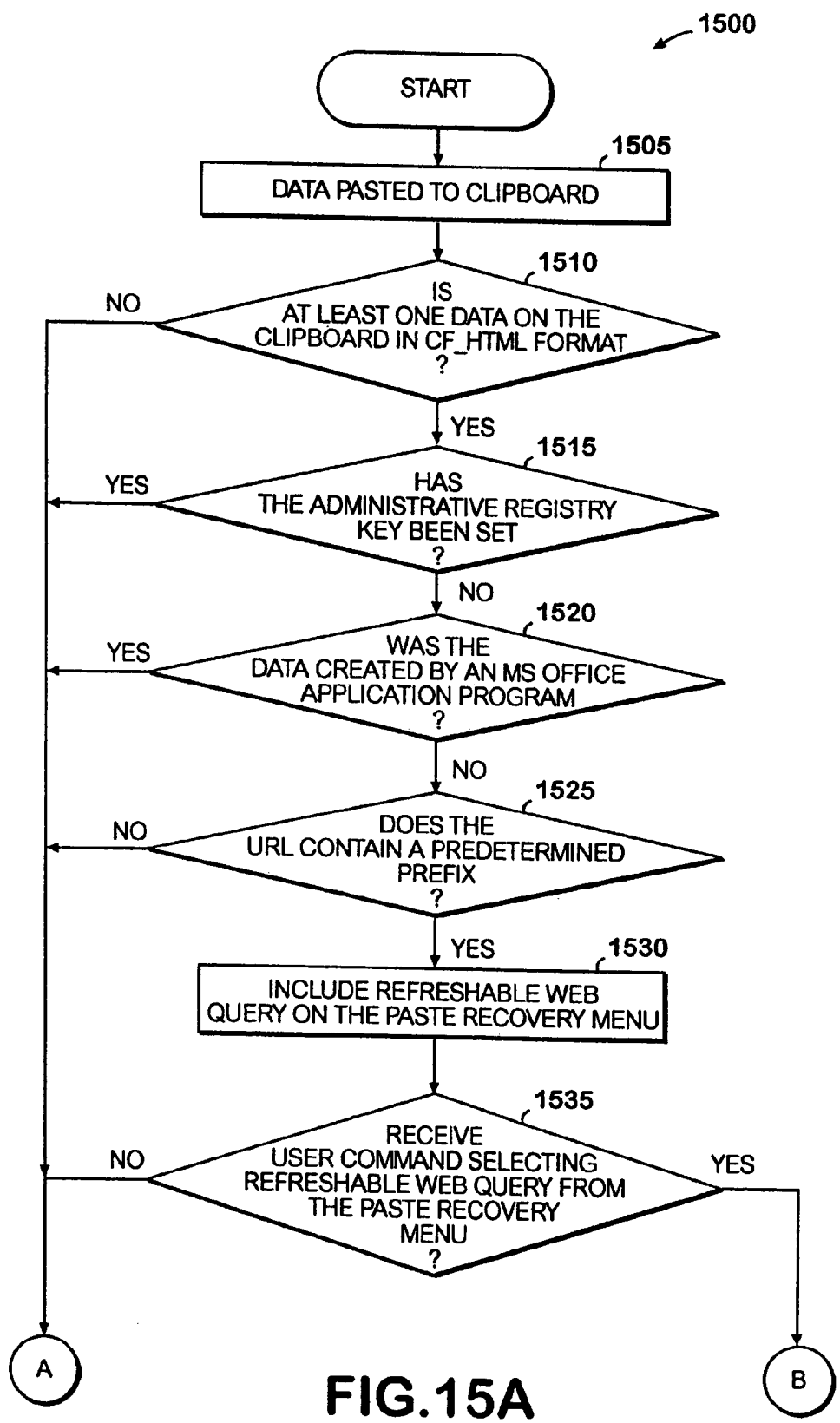
FIGS. 15A and 15B, hereinafter collectively referred to as FIG. 15, are a logic flow diagram illustrating an exemplary technique of the Copy-Paste Web Query module for applying the Refreshable Web Query utility to the MICROSOFT EXCEL 2002 spreadsheet program.
Figure 15B:
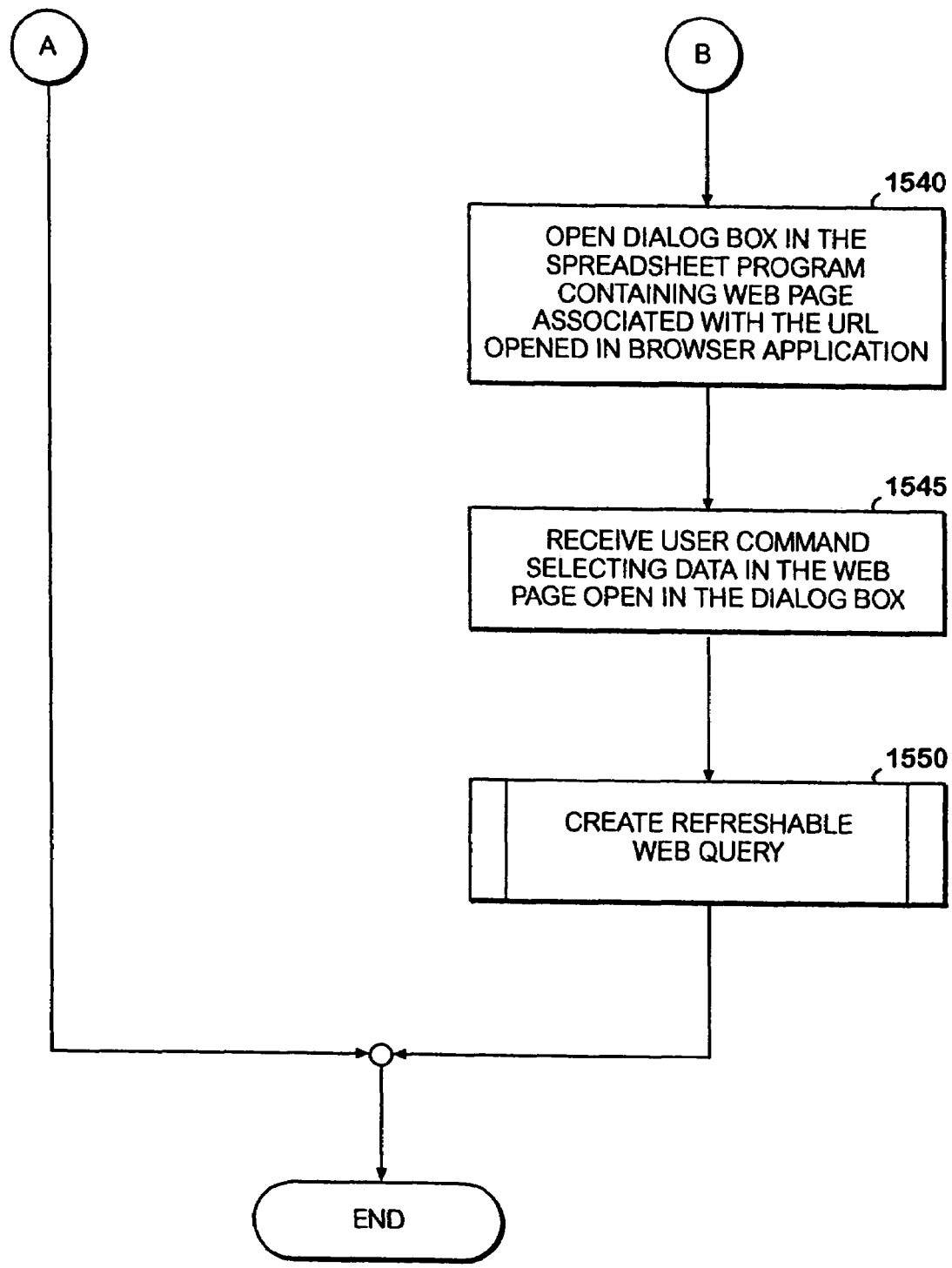

FIG. 15 (comprised of FIGS. 15A and 15B) is a logic block diagram illustrating the technique for applying the Copy-Paste Web Query module to a spreadsheet program. FIG. 15 is a logic flow diagram illustrating a routine 1500 for applying the operation of the Copy-Paste Web Query module to create a refreshable Web Query in the MICROSOFT EXCEL 2002 spreadsheet program. Those skilled in the art will appreciate that the logic flow diagram of FIG. 15 is executed by the processing unit 21 (FIG. 1) in response to instructions that have been incorporated into the WQST utility 100.

Routine 1500 begins at step 1505, in which the tabular data selected from Web page open in an Internet browser is pasted into a spreadsheet program. However, when the Paste command is invoked to import tabular data into the MICROSOFT EXCEL 2002 spreadsheet program, the data is placed in a temporary memory location, known as a Clipboard. Once the Paste operation is completed, the tabular data is copied from the Clipboard to a location in a MICROSOFT EXCEL 2002 worksheet selected by the user. The tabular data remains on the Clipboard after the completion of the Paste command, which allows the user the option to paste the same data multiple times.

Step 1505 is followed by step 1510, in which the Copy-Paste Web Query makes a determination whether the tabular data that was copied to the Clipboard is formatted as CF_HTML data. The CF_HTML data format is typically used to transfer data between MICROSOFT OFFICE XP applications via the Clipboard. Although the Copy-Paste Web Query module uses the CF_HTML format, those skilled in the art will appreciate that other formats, which facilitate the transfer of data between applications, may be used without altering the scope of the invention. If the determination is made that the tabular data cannot format as CF_HTML, then the "NO" branch is followed to the "END" step.

However, if the determination is made that the tabular data copied to the Clipboard can be formatted as CF_HTML, the "YES" branch is followed to step 1515. At step 1515 the determination is made whether a registry key associated with the tabular data, namely the Administrative Registry Key, has been set to disable. If the Administrative Registry Key has been set to disable, the "YES" branch is followed to the "END" step.

On the other hand, if the Administrative Registry Key has not been set to disable, the "NO" branch is followed to step 1520, in which the determination is made whether the tabular data was created by an application program other than a MICROSOFT OFFICE XP application program, such as the MICROSOFT WORD, MICROSOFT PUBLISHER, MICROSOFT ACCESS, MICROSOFT POWERPOINT, or MICROSOFT FRONTPAGE application program. Specifically, the Copy-Paste Web Query module checks the "ProgID" META tag inside the header of the CF_HTML, which specifies the application program source. If this flag is enabled, it indicates that the MICROSOFT EXCEL spreadsheet program, or another MICROSOFT OFFICE XP application program (i.e., the MICROSOFT WORD, MICROSOFT EXCEL 2002 MICROSOFT POWERPOINT, MICROSOFT ACCESS, or MICROSOFT PUBLISHER program) created the tabular data and, the "YES" branch is followed to the "END" step.

If, however, the identifying tag indicates that the tabular data was created by a non-MICROSOFT OFFICE XP application program the "NO" branch is followed to step 1525, in which the Copy-Paste Web Query module determines whether the URL associated with the tabular data is well formed, or contains a predetermined prefix. That is, the Copy-Paste Web Query module determines whether the SourceURL string at the beginning of the URL associated with the tabular data contains the value "http://", "https://", "htp://", or "file://" at the beginning of the URL. This insures that the tabular data is associated with a valid URL that may be accessed later to update the tabular data. If the source URL is not well formed, then the "NO" branch is followed to the "END" step. If the source URL is not well formed, any attempt to later refresh the data will be unsuccessful because the correct URL will not be accessible. Therefore, instead of allowing the user to get into a potentially frustrating situation, the WQST utility imports the data in the usual manner.

However, if the URL associated with the tabular data is well formed, the Copy-Paste Web Query module follows the "YES" branch to step 1530. At step 1530 the Copy-Paste Web Query module displays the "Create Refreshable Web Query" option on the Paste Recovery Smart Tag, which allows the user to copy and paste data in the normal manner but also open the Web Query menu.

Step 1530 is followed by step 1535, in which the determination is made as to whether the user selected the refreshable Web Query option from the Paste Recovery Smart Tag. If the user did not select the refreshable Web Query option from the Paste Recovery Smart Tag, then the "NO" branch is followed to the "END" step. If, however, the determination is made that the user selected the refreshable Web Query option, then the "YES" branch is followed to step 1540, in which the Copy-Paste Web Query module opens a Web Query dialog box in the spreadsheet application and pre-loads the URL of the Web page currently open in the Internet browser module, which the tabular data was copied from. Step 1540 is followed by step 1545, in which the user selects either the same, different, or multiple instances of tabular data that was pasted in the spreadsheet program to create a refreshable Web Query.

Step 1545 is followed by step 1550, in which the Copy-Paste Web Query module creates a refreshable Web Query. To create the refreshable Web Query, the user first selects the tabular data from the Web Query dialog box and selects a predefined button. When the user selects the predefined button, the Copy-Paste Web Query module pastes the tabular data into the same spot in the spreadsheet program as the original paste. The Copy-Paste Web Query module simultaneously creates a link between the tabular data pasted in the spreadsheet program and the tabular data in the Internet browser module. Finally, step 1550 is followed by the "END" step.

Figure 16:
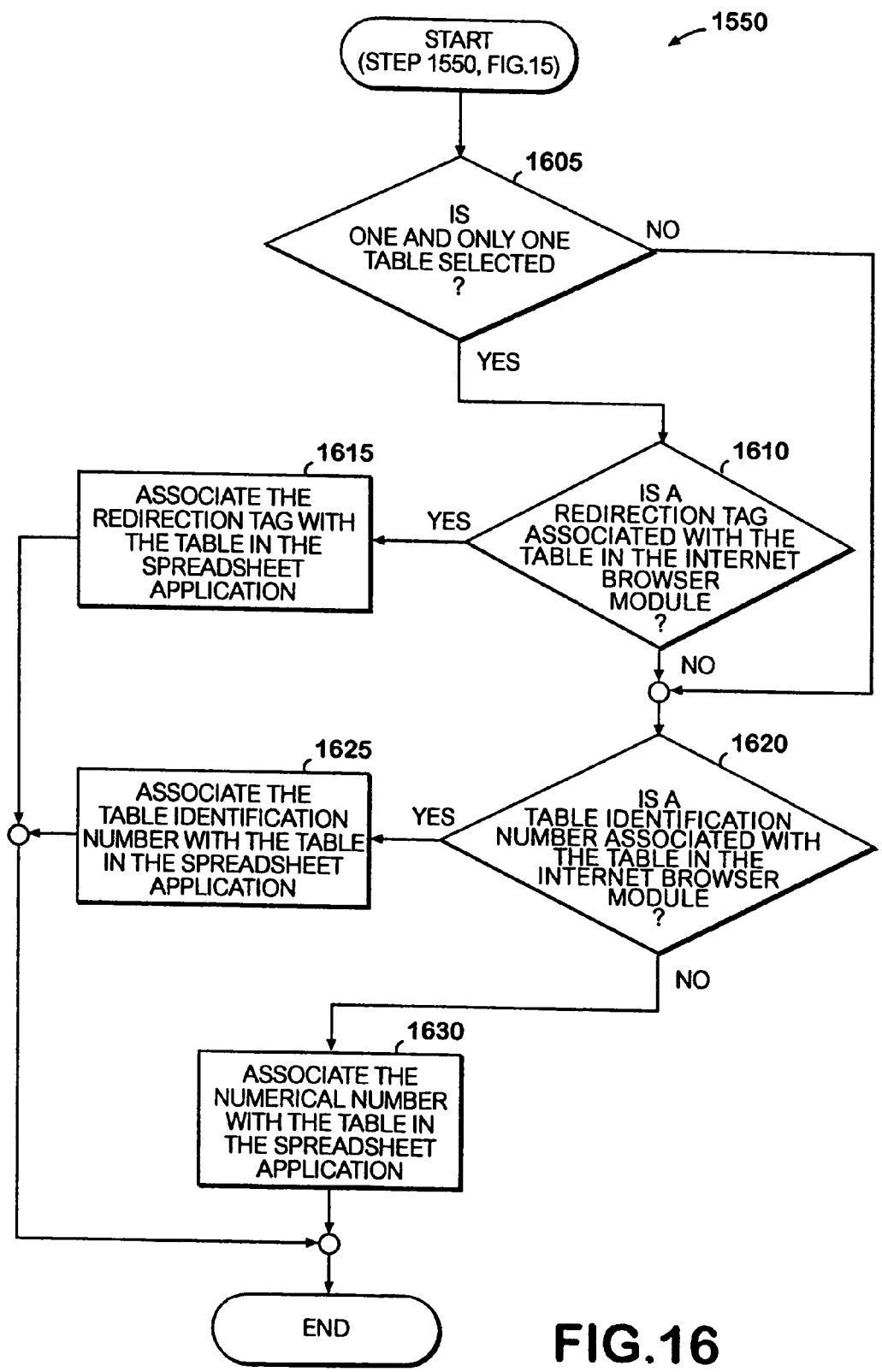
FIG. 16 is a logic flow diagram illustrating an exemplary technique for creating a refreshable Web Query.

FIG. 16 is a logical flow diagram illustrating routine 1550 in FIG. 15, which creates a refreshable Web Query. Routine 1550 begins after step 1520 in FIG. 15 and starts at step 1605, in which the determination is made whether a single instance of tabular data on the Web page has been selected. If a single table has been selected the "YES" branch is followed to step 1610, in which the determination is made whether a redirection tag is associated with the tabular data in the Internet browser module. The redirection tag is described fully in the U.S. patent application Ser. No. 60/220,236, entitled "Method For Redirecting the Source of a Data Object Displayed in an HTML Document," filed on Jul. 21, 2000 herein incorporated by reference.

If the redirection tag is associated with the tabular data, the "YES" branch is followed to step 1625, in which the Copy-Paste Web Query module associates the redirection tag with the tabular data pasted in the spreadsheet program. Step 1625 is then followed by the "END" step. If however there in no redirection tag associated with the tabular data, the "NO" branch is followed to step 1615.

At step 1615, the Copy-Paste Web Query module determines whether a tabular data identifier is associated with the tabular data. Typically, tabular data contained in HTML formatted files (including CF_HTML) will be assigned a tabular data identifier that identifies its location within the file relative to other tabular data. The tabular data identifier allows other programs or programmers to quickly and easily access or edit a particular tabular data. However, there are some instances in which the tabular data identifier may be altered or deleted. For instance, when tabular data is inserted into a file, tabular data identifiers of the tabular data lying below the newly inserted tabular data will be incremented by one. Therefore, the Copy-Paste Web Query module looks at the tabular data copied from the Internet application module to determine whether the tabular data identifier is associated with the tabular data. If a tabular data identifier is associated with the tabular data, the "YES" branch is followed to step 1630, where the tabular data identifier is associated with the tabular data pasted in the spreadsheet program. Step 1630 is then followed by the "END" step.

However, if the determination is made that a tabular data identifier is not associated with the tabular data, the "NO" branch is followed to step 1620, in which the Copy-Paste Web Query module assigns a numerical identifier, which is associated with tabular data copied from the Internet browser module. In HTML formatted files, an index number can always be computed for each object. The index number corresponds to the order in which the objects appear in the file. This allows Internet browser modules to place the objects in the correct positions on the display. The Copy-Paste Web Query module can use this index number to identify the tabular data that the user copied from the Web page and link it to the tabular data pasted in the spreadsheet program. Therefore, if neither a redirection flag nor a tabular data number is associated with the tabular data in the Web page, the Copy-Paste Web Query module can use the index number to link the tabular data pasted in the spreadsheet with the tabular data in the browser module. In this manner, each time the user wishes to update the tabular data in the spreadsheet program, the Copy-Paste Web Query module simply retrieves the associated index number, opens the corresponding URL, and retrieves the tabular data from the Web page. Step 1620 is then followed by the "END" step.

Export to Microsoft Excel Module

The second embodiment of the WQST utility is embedded in a software module known as the "Export to Microsoft Excel" module. The Export to Microsoft Excel module allows a user to create a refreshable Web Query in the MICROSOFT EXCEL 2002 spreadsheet program, directly from the MICROSOFT INTERNET EXPLORER Web browser program. To create a refreshable Web Query using the "Export to Microsoft Excel" module, the user first positions the cursor using a pointing device, such as a mouse, over tabular data from a Web page open in the MICROSOFT INTERNET EXPLORER browser program. Next, the user depresses the right mouse button to activate a context menu, which contains the optional command "Export to Microsoft Excel." The user then selects the "Export to Microsoft Excel" command, which causes the "Export to Microsoft Excel" module to launch the MICROSOFT EXCEL 2002 spreadsheet program and create a refreshable Web Query using a tabular data identifier.

The "Export to Microsoft Excel" module is written in a script programming language, such as VBScript, and typically resides in the executable data file of the MICROSOFT EXCEL 2002 spreadsheet program. The module is stored in the executable file to prevent either intentional or unintentional tampering of the code. However, those skilled in the art will appreciate the module may reside outside the executable code, such as in a function, routine, or DLL and the like. An example of a VBScript that may implement the "Export to Microsoft Excel" module is shown below.

```
<SCRIPT language=VBScript>
DIM xlApp
DIM xlWorkBook
ON ERROR RESUME NEXT
'Set IE variables and get the URL
SET ieParentWin = external.menuArguments
ieSrcURL = ieParentWin.location.href
fTableSel = FALSE
SET ieSrcElem = ieParentWin.event.srcElement
IF ERR = 0 AND UCASE(ieParentWin.document.selection.type) =
"NONE" THEN
        tagName = UCASE(ieSrcElem.tagName)
        DO UNTIL tagName = "TABLE" OR tagName = "BODY"
            SET ieSrcElem = ieSrcElem.parentElement
            tagName = UCASE(ieSrcElem.tagName)
        LOOP
        IF tagName = "TABLE" THEN
            tagParentName = tagName
            SET ieParent = ieSrcElem
            DO UNTIL tagParentName = "BODY" OR
            tagParentName = "VIEW"
                SET ieParent = ieParent.parentElement
                tagParentName = UCASE(ieParent.tagName)
            LOOP
            IF tagParentName <> "VIEW" THEN
                fTableSel = TRUE
                IF ieSrcElem.ID <> "" THEN
                    ieSrcConnect = ieSrcElem.ID
                ELSE
                    SET ieTables =
ieParentWin.document.all.tags("table")
                    ieSrcConnect = 1
                    FOR EACH ieTable IN ieTables
                        IF ieTable.sourceIndex =
ieSrcElem.sourceIndex THEN
                            EXIT FOR
                        END IF
                        ieSrcConnect = ieSrcConnect + 1
                    NEXT
                END IF
            END IF
        END IF
END IF
SET xlApp = CreateObject("Excel.Application")
ON ERROR GOTO 0
SET xlWorkbook = xlApp.Workbooks.Add
ON ERROR RESUME NEXT
xlApp.Visible = True
IF fTableSel THEN
        webQuerySourceHRef = ieSrcElem.getAttribute
        ("o:WebQuerySourceHRef")
        If webQuerySourceHRef <> "" THEN
            SET xlQueryTable =
xlWorkbook.Worksheets(1).QueryTables.Add("URL;" &
webQuerySourceHRef,
xlWorkbook.WorkSheets(1).Cells(1,1))
                xlQueryTable.EditWebPage = ieSrcURL
            ELSE
                SET xlQueryTable =
```

-continued

```
xlWorkbook.Worksheets(1).QueryTables.Add("URL;" &ieSrcURL,
xlWorkbook.WorkSheets(1).Cells(1,1))
                xlQueryTable.EditWebPage = ""
        END IF
            xlQueryTable.FieldNames = True
            xlQueryTable.RowNumbers = False
            xlQueryTable.FillAdjacentFormulas = False
            xlQueryTable.PreserveFormatting = True
            xlQueryTable.RefreshOnFileOpen = False
            xlQueryTable.BackgroundQuery = True
            xlQueryTable.RefreshStyle = 0 'xlOverwriteCells
            xlQueryTable.SavePassword = False
            xlQueryTable.SaveData = True
            xlQueryTable.AdjustColumnWidth = True
            xlQueryTable.RefreshPeriod = 0
            xlQueryTable.WebSelectionType = 3 'xlSpecifiedTables
            xlQueryTable.WebFormatting = 3 'xl WebFormattingNone
            xlQueryTable.WebTables = ieSrcConnect
            xlQueryTable.WebPreFormattedTextToColumns = True
            xlQueryTable.WebConsecutiveDelimitersAsOne = True
            xlQueryTable.WebSingleBlockTextImport = False
            xlQueryTable.WebDisableDateRecognition = False
            xlQueryTable.WebDisableRedirections = False
            xlQueryTable.Refresh
ELSE
            xlApp.Dialogs(667).Show ieSrcURL
END IF
</Script>
```

Figure 17:
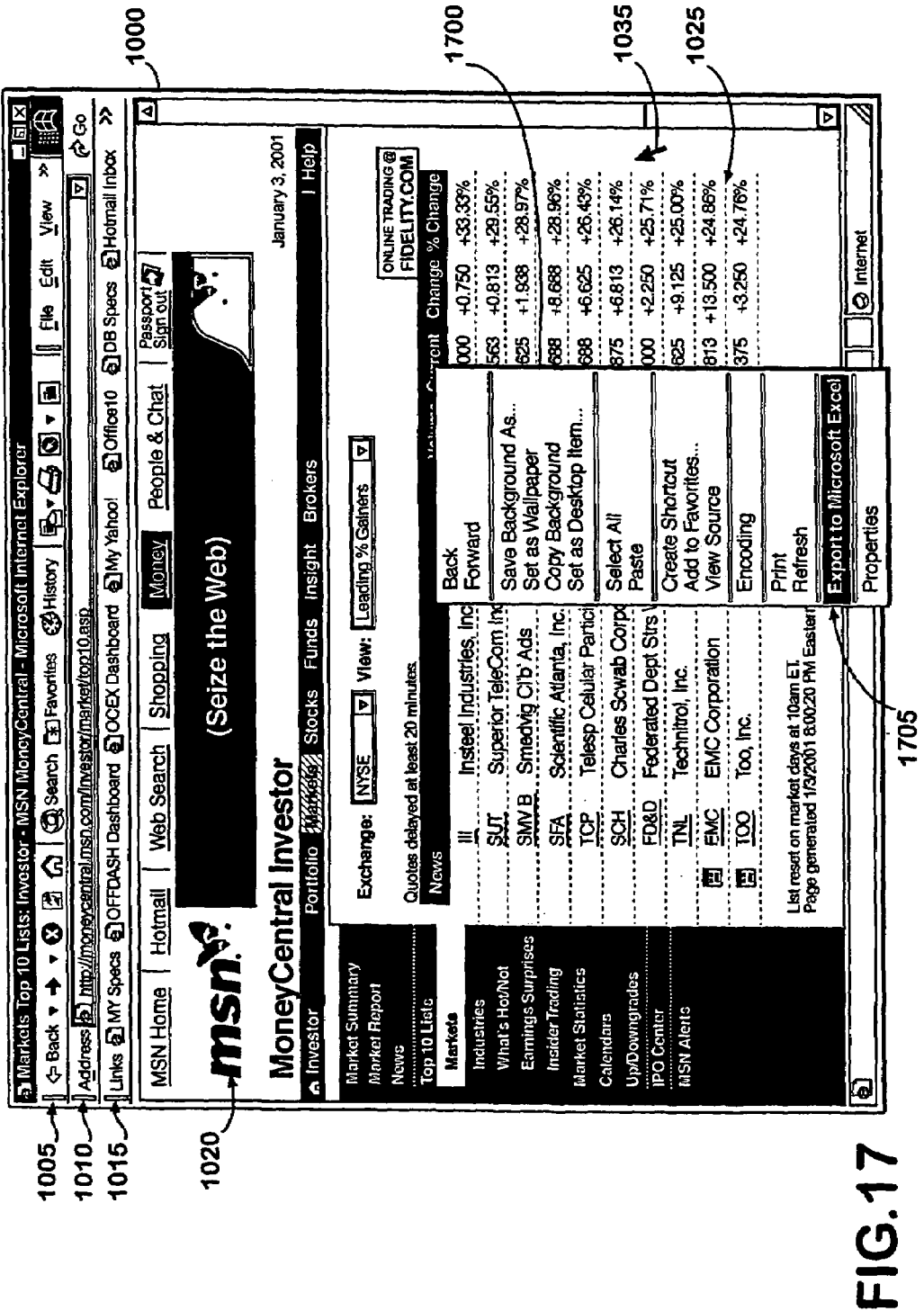
FIG. 17 is a screen display illustrating a screen shot of the selection of the "Export to Microsoft Excel" command for a tabular data in a Web page open in an Internet browser module.

FIG. 17 is an illustration of a screen display in the MICROSOFT INTERNET EXPLORER window 1000 (FIG. 10) illustrating the invocation of the "Export to Microsoft Excel" command. The "Export to Microsoft Excel" command is invoked by a user placing the cursor 1035 using a mouse over tabular data 1025 and depressing the right mouse button. Although the invention is described as being activated by depressing the right button on a mouse, those skilled in the art will appreciate that other pointing devices such as trackballs, styluses and keyboards or any other pointing devices that support multiple buttons may be used to activate the "Export to Microsoft Excel" module. When the cursor 1035 is positioned over tabular data and the user depresses the right mouse button, a context menu 1700 will appear within the MICROSOFT INTERNET EXPLORER window 1000. The context menu 1700 contains commands that allow the user to edit the contents of the MICROSOFT INTERNET EXPLORER window 1000. Specifically, the context menu 1700 contains the command "Export to Microsoft Excel" 1705. When the "Export to Microsoft Excel" 1705 command is selected, the Export to Microsoft Excel module launches MICROSOFT EXCEL, 2002 opens a new worksheet, and pastes the tabular data into the worksheet as a refreshable Web Query.

The "Export to Microsoft Excel" command 1705 is not a standard command in the MICROSOFT INTERNET EXPLORER context menu 1700. Therefore, the "Export to Microsoft Excel" command 1705 must be registered with the MICROSOFT INTERNET EXPLORER browser program prior to using the "Export to Microsoft Excel" module. Specifically, upon installation of the MICROSOFT EXCEL 2002 spreadsheet program, the following key is added to the registry:

HKEY_CURRENT_USER\Software\Microsoft\Internet Explorer\MenuExt\Export to Microsoft Excel\res:// <path>/300 Contexts 0x1

Where "<path>" indicates the location on the user's hard drive where the MICROSOFT EXCEL 2002 spreadsheet program is installed. In the exemplary embodiment, the <path> is specified as "c: \program files\Microsoft office\office10\excel.exe," which is the default location used by the MICROSOFT EXCEL 2002 spreadsheet program for installation. Alternatively, the user may specify any location for the <path> that indicates the location on the hard drive where the MICROSOFT EXCEL 2002 spreadsheet program is installed.

In the exemplary embodiment, registration of the "Export to Microsoft Excel" command 1705 with the MICROSOFT INTERNET EXPLORER browser program is performed automatically during installation of the MICROSOFT EXCEL 2002 spreadsheet program. Registration of the "Export to Microsoft Excel" command 1705 may also be presented as an option to the user during the installation process or through the use of an "Install Wizard," or when the user first attempts to invoke the "Export to Microsoft Excel" command 1705.

Figure 18:
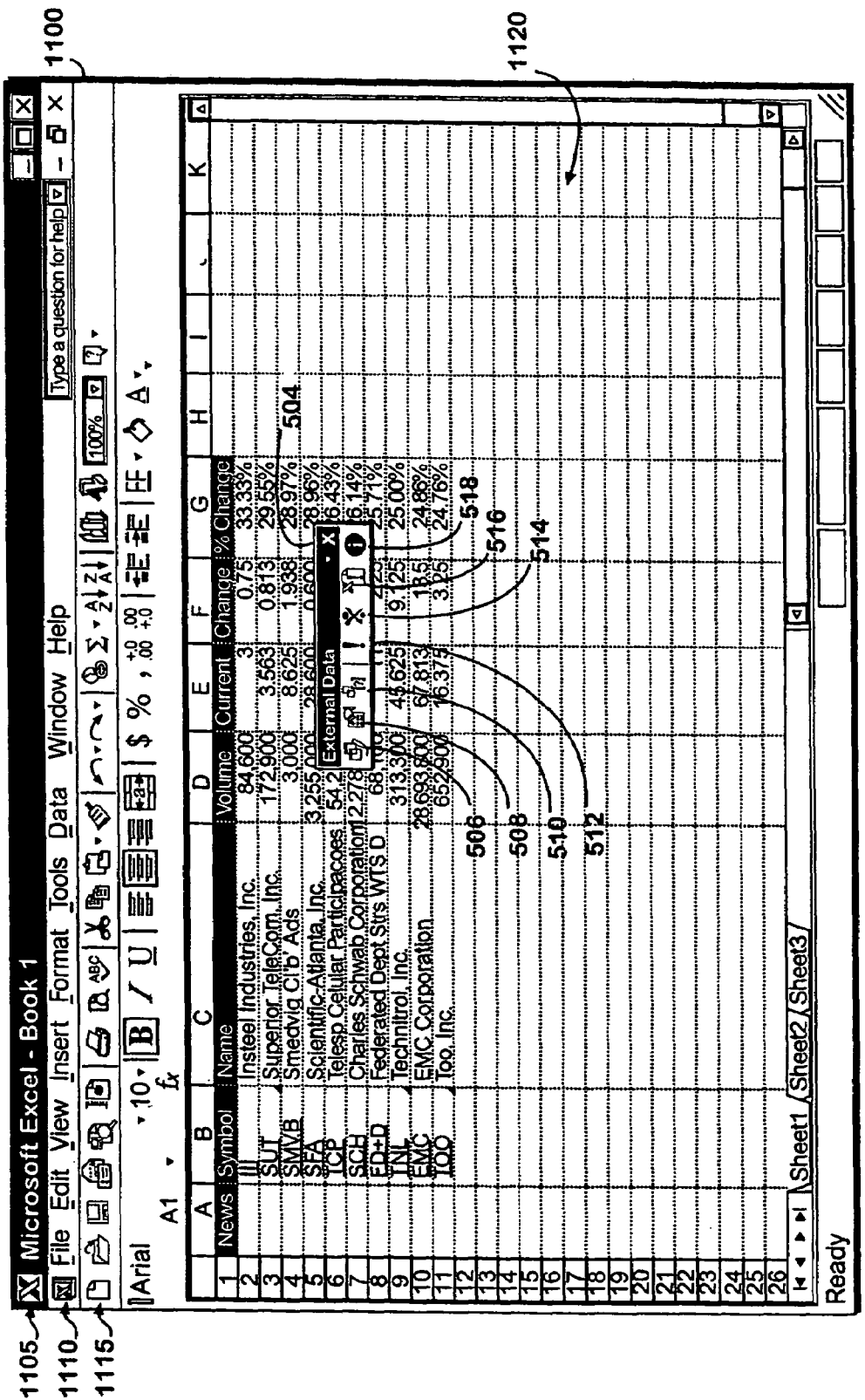
FIG. 18 is a screen display illustrating a screen shot after the "Export to Microsoft Excel" module of the Refreshable Web Query utility has completed inserting the tabular data into a MICROSOFT EXCEL 2002 worksheet.

FIG. 18 is an illustration of a screen display in a MICROSOFT EXCEL 2002 window illustrating a refreshable Web Query created using the Export to Microsoft Excel module. The screen display is identical to the screen display described previously in FIG. 14.

Figure 19:
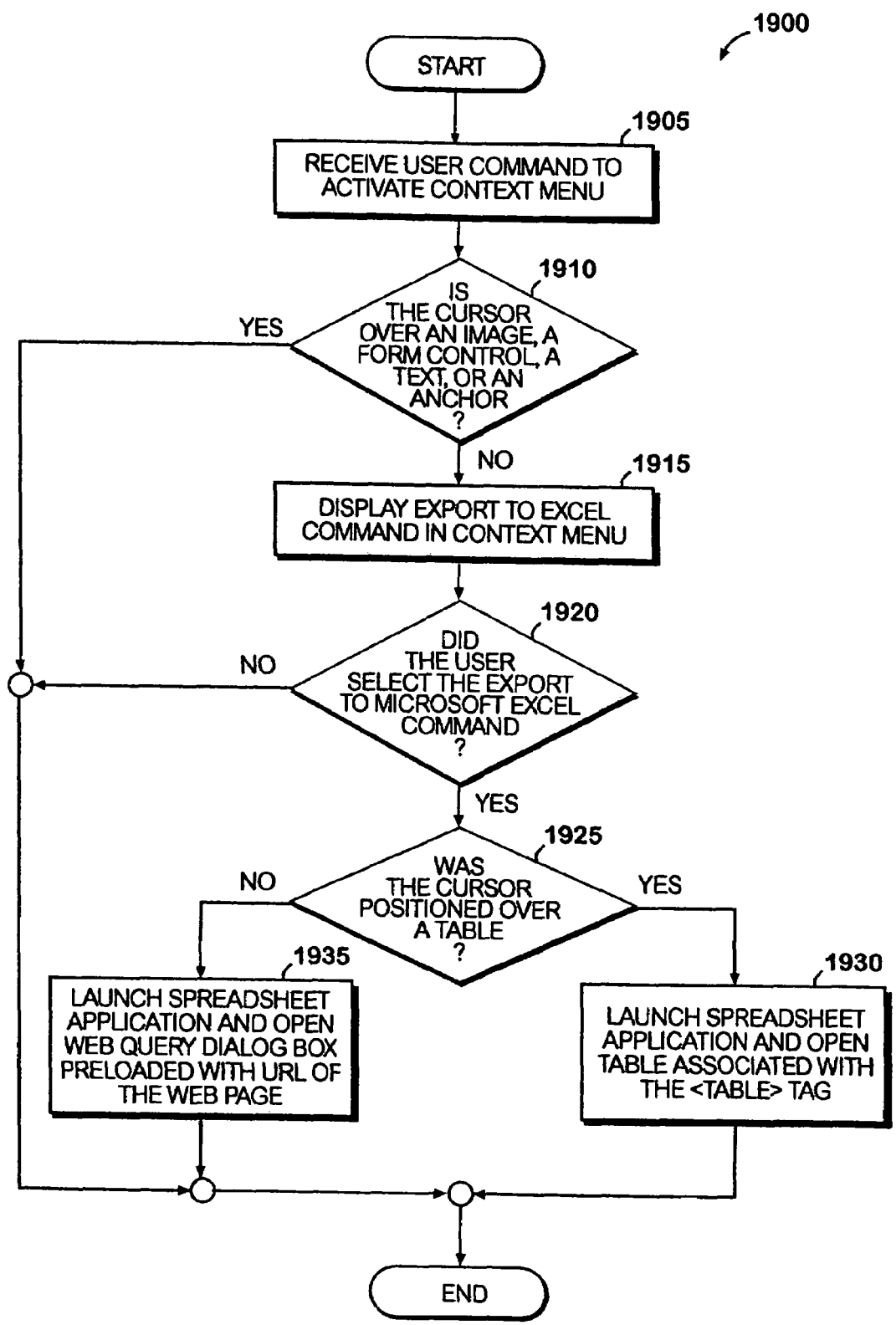
FIG. 19 is a logic flow diagram illustrating an exemplary technique of the "Export to Microsoft Excel" module for applying the Refreshable Web Query utility to a spreadsheet program.

FIG. 19 is a logic flow diagram illustrating the routine 1900 for applying the "Export to Microsoft Excel" module to an Internet browser application program. Routine 1900 begins at step 1905, in which the user inputs a command to activate the context menu. The user activates the context menu by placing the cursor in the active window and depresses a control key. Typically, the user positions the cursor using a pointing device such as a mouse and activates the context menu by depressing the right mouse button (for a mouse with more than one mouse button). The user may also activate the context menu by depressing a key or combination of keys on a keyboard.

Once the context menu is activated, step 1905 is followed by step 1910, in which the Export to Microsoft Excel module determines if the cursor was positioned over an image, a form control, an anchor, or any text within the Web page. If the cursor was positioned over text at the time the control key was depressed, the "YES" branch is followed to the "END" step because a Refreshable Web Query cannot be generated using one of these objects. The "Export to Microsoft Excel" command is not displayed on the context menu because the presumption is made that since the cursor is positioned on an object other than tabular data, the user does not wish to export tabular data into a Web Query.

However, if the determination is made that the cursor is not over an image, a form control, an anchor, or any text, the presumption is made that the user wishes to import the object into a Web Query and the "NO" branch is followed to step 1915. In step 1915, the "Export to Microsoft Excel" module displays the option to "Export to Microsoft Excel" on the context menu. Routine 1900 then proceeds to step 1920, in which the determination is made as to whether the user has selected the "Export to Microsoft Excel" option from the context menu. If the user selected this option, the "YES" branch is followed to step 1925, in which the determination is made whether the cursor was positioned over a table. Typically, the "Export to Microsoft Excel" module only knows the object that the user selected to export. To determine whether the object was a table or some other object, the "Export to Microsoft Excel" module locates the object in the DOM and proceeds to check every precedent element in the DOM. If a <TABLE> tag is encountered in the DOM before the <BODY> tag is reached, the determination is made that the user has selected a table to export to the MICROSOFT EXCEL spreadsheet program. In this instance, the "YES" branch is followed to step 1930.

At step 1930, the "Export to Microsoft Excel" module launches the MICROSOFT EXCEL 2002 spreadsheet program and opens the table associated with the <TABLE> tag in a new worksheet in the MICROSOFT EXCEL spreadsheet program. Once the table has been opened in the MICROSOFT EXCEL 2002 spreadsheet program, the procedure for exporting data into the MICROSOFT EXCEL 2002 spreadsheet program is complete and step 1930 is followed by the "END" step.

Returning to step 1925, if the determination is made that the user did not have their cursor positioned over an instance of tabular data when they selected the "Export to Microsoft Excel" option from the context menu, the "NO" branch is followed to step 1935. Again at this step, the "Export to Microsoft Excel" module locates the object in the DOM that the cursor is positioned over when the user invoked the context menu and checks each of the precedent elements in the DOM. Because the cursor was not positioned over an instance of tabular data, the <BODY> tag of the HTML document will be reached before any <TABLE> tag is encountered.

At step 1935, the MICROSOFT EXCEL 2002 spreadsheet program is launched and a Web Query dialog box is opened. The Web Query dialog box is pre-loaded with the URL of the Web page that the user had opened in his or her browser application program. The entire Web page is loaded into the Web Query dialog box, which allows the user to select an object to import into the MICROSOFT EXCEL 2002 spreadsheet program. Alternatively, at this point, the user may choose to export the entire Web page into a Web Query within the MICROSOFT EXCEL 2002 spreadsheet program. Once the user has created the Web Query, the operation is complete and step 1935 is followed by the "END" step.

Going back to step 1920, if the user did not select the "Export to Microsoft Excel" option from the context menu at step 1920, it is assumed that the user did not wish to create a Web Query by exporting data from the browser application to the MICROSOFT EXCEL 2002 spreadsheet program and the "NO" branch is followed to the "END" step.

Similarly, if it was determined at step 1910 that the cursor was not positioned over a tabular data when the user activated the context menu, it is assumed that the user did not wish to export the data to the MICROSOFT EXCEL 2002 spreadsheet program and the "Export to Microsoft Excel" command is not displayed on the context menu and the "NO" branch is followed to the "END" step.

Edit with Microsoft Excel Module

The third embodiment of the WQST utility may be embedded in a software module, known as "Edit with Microsoft Excel." The "Edit with Microsoft Excel" module allows a user to open the entire file or choose a portion of the file to import into the MICROSOFT EXCEL 2002 spreadsheet program to analyze the content. When a user decides to edit an HTML document, they typically select the Edit command from the Edit drop-down menu from the menu bar. The drop-down menu bar allows the user the option to edit the HTML document in the MICROSOFT EXCEL 2002 spreadsheet program even if the document was created with another Web development program. For example, if an HTML document that contains several instances of tabular data were created with a word processing program, such as the MICROSOFT WORD word processing program, and the user wanted to edit one instance of the tabular data, the user would have the option to use either the MICROSOFT WORD or MICROSOFT EXCEL 2002 program. Once the Edit command is invoked, the user is given the choice to use either the MICROSOFT WORD program, which was used to create the HTML document, or the MICROSOFT EXCEL 2002 program, which offer a more robust set of tools for editing tabular data. If the user elects to use the MICROSOFT EXCEL 2002 spreadsheet program to edit the tabular data, the "Edit with Microsoft Excel" module determines whether the HTML document was created with the MICROSOFT EXCEL 2002 spreadsheet program or another Web development program by examining an identification tag associated with the HTML document that identifies what program was used to create the HTML document. Specifically, the "Edit with Microsoft Excel" module examines the value of the "Generator" META tag contained in the HTML document header entitled "Generator." If the value of the META tag indicates that the MICROSOFT EXCEL 2002 spreadsheet program was used to create the HTML document, then the "Edit with Microsoft Excel" module opens the MICROSOFT EXCEL 2002 spreadsheet program and automatically imports the tabular data into a MICROSOFT EXCEL 2002 worksheet. If however, the "Generator" META tag indicates that a Web development application program other than the MICROSOFT EXCEL 2002 spreadsheet program was used to create the HTML file, then the "Edit with Microsoft Excel" module launches the MICROSOFT EXCEL 2002 spreadsheet program and opens a new Web Query dialog box that is preloaded with the URL of the HTML document. The user can then select either the entire Web page or specific instances of tabular data to import into a Web Query.

To operate effectively, the "Edit with Microsoft Excel" module is integrated into both the Web browser program and the MICROSOFT EXCEL 2002 spreadsheet program. The drop-down Edit command in the Web browser program must permanently display the "Edit with Microsoft Excel" option and the spreadsheet program must support a new DDE operation, named "New WebQuery?," which when invoked by the "Edit with Microsoft Excel" command, opens a New Web Query dialog box and pre-navigates to the URL of the HTML document. The "Edit with Microsoft Excel" module adds the following keys to the registry to support the new DDE function:

```
[HKEY_CLASSES_ROOT\Excel.WebQuery]
[HKEY_CLASSES_ROOT\Excel.WebQuery\shell]
[HKEY_CLASSES_ROOT\Excel.WebQuery\shell\edit]
[HKEY_CLASSES_ROOT\Excel.WebQuery\shell\edit\command]
@="\"D:\\PROGRA~1\\MICROS~3\\Office 10\\EXCEL.EXE\
"/w \"%1\""
[HKEY_CLASSES_ROOT\Excel.WebQuery\shell\edit\ddeexec]
@="[new()][newWebquery?(\"%1\")]"
[HKEY_CLASSES_ROOT\Excel.WebQuery\shell\edit\ddeexec\
application]
@="Excel"
[HKEY_CLASSES_ROOT\Excel.WebQuery\shell\edit\ddeexec\topic]
@="system"
```

Figure 20:
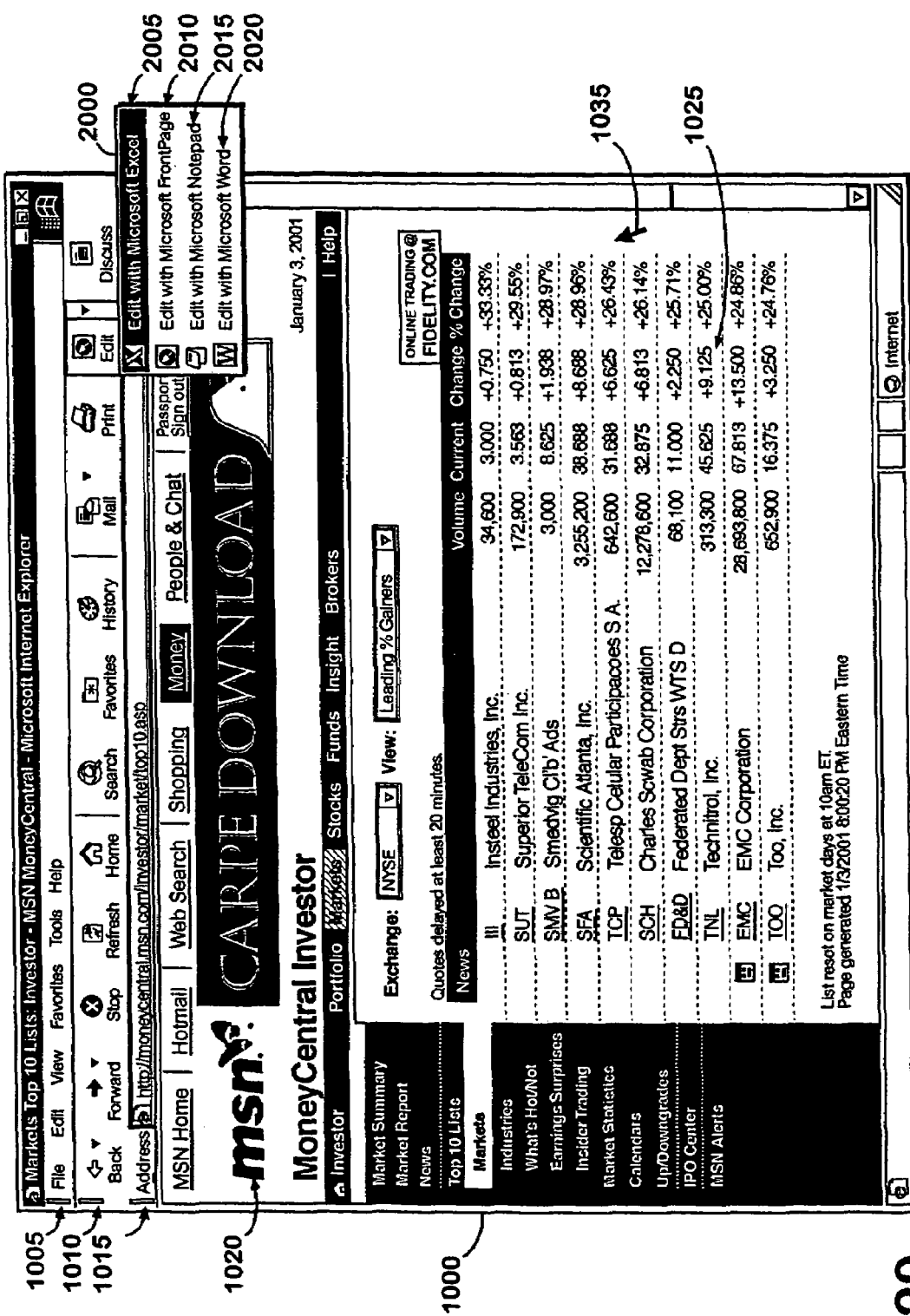
FIG. 20 is a screen display of the creation of a refreshable Web Query using the "Edit with Microsoft Excel" command from the drop down Edit menu in an Internet browser module.

FIG. 20 is an illustration of a screen display in a MICROSOFT INTERNET EXPLORER window 1000 (FIG. 10) illustrating the result of a user invoking the "Edit with Microsoft Excel" command. In the illustration the viewing area 1020 of the MICROSOFT INTERNET EXPLORER window 1000 contains a web page containing tabular data 1025. In the illustration the Edit command from the menu bar 1010 has been selected, which in turn caused a drop-down Edit menu 2000 to appear. The drop-down Edit menu 2000 contains several commands for editing the Web page. Specifically, the drop-down Edit menu 2000 contains an "Edit with Microsoft Excel" command 2005, an "Edit with Microsoft FrontPage" command 2010, an "Edit with Windows Notepad" command 2015 and an Edit with Microsoft Word" command 2020. Typically under the Edit menu, the commands displayed will be the "Edit with application program," where application program will be the name of the application program that can be used to create or modify a Web page.

Figure 21:
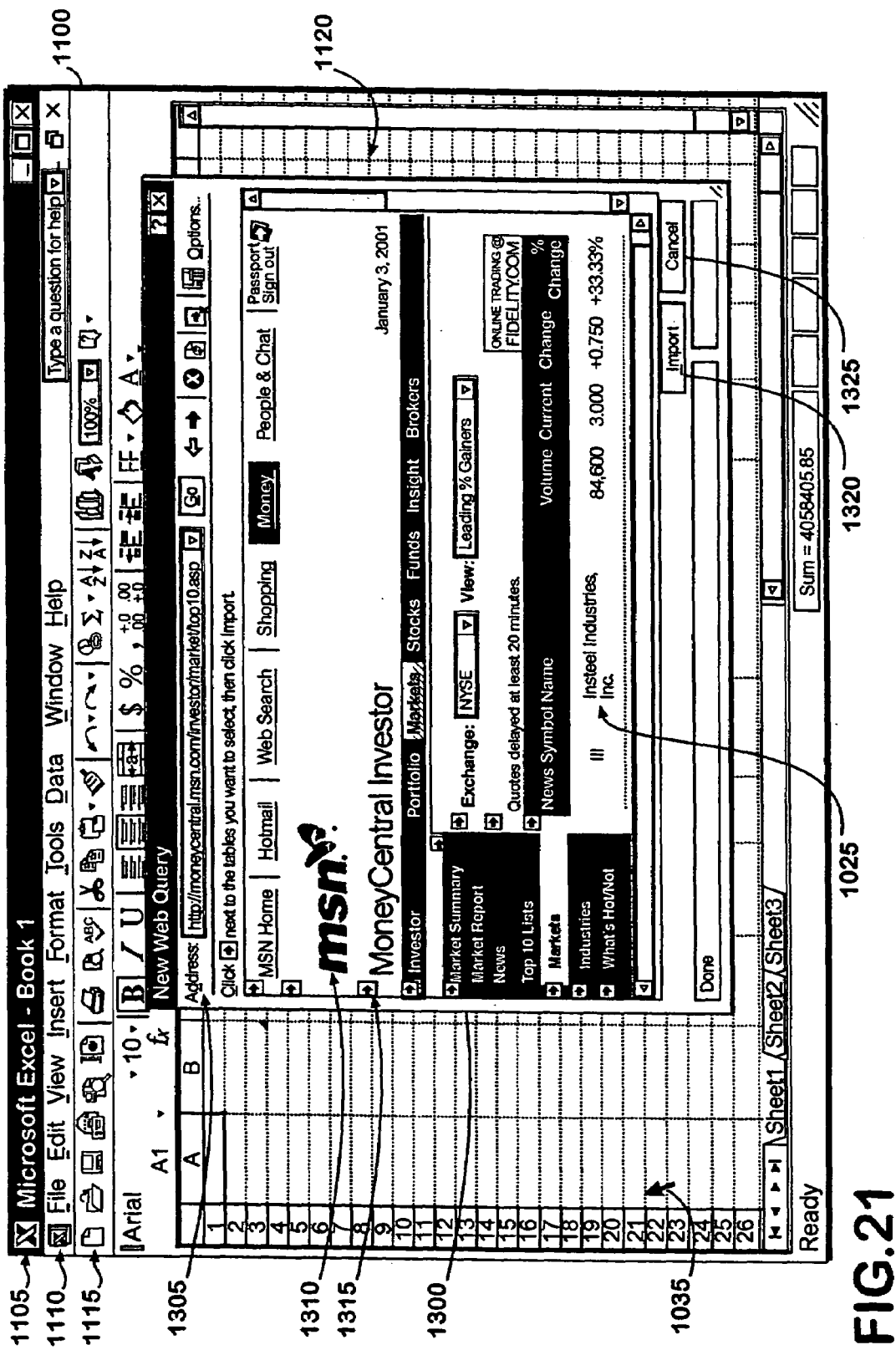
FIG. 21 is a screen display of a MICROSOFT EXCEL 2002 spreadsheet illustrating the result of a user selecting the "Edit with Microsoft Excel" command.

FIG. 21 is an illustration of a screen display in a MICROSOFT EXCEL 2002 window 1100 (FIG. 11) showing the result of a user selecting the "Edit with Microsoft Excel" command 2005 option from the drop-down Edit menu 2000 (FIG. 20). In the illustration, a New Web Query dialog box is opened with the URL of the Web site preloaded into the address bar. At this point the user may select the entire Web page or individual instances of tabular data to import into a MICROSOFT EXCEL 2002 worksheet.

Figure 22:
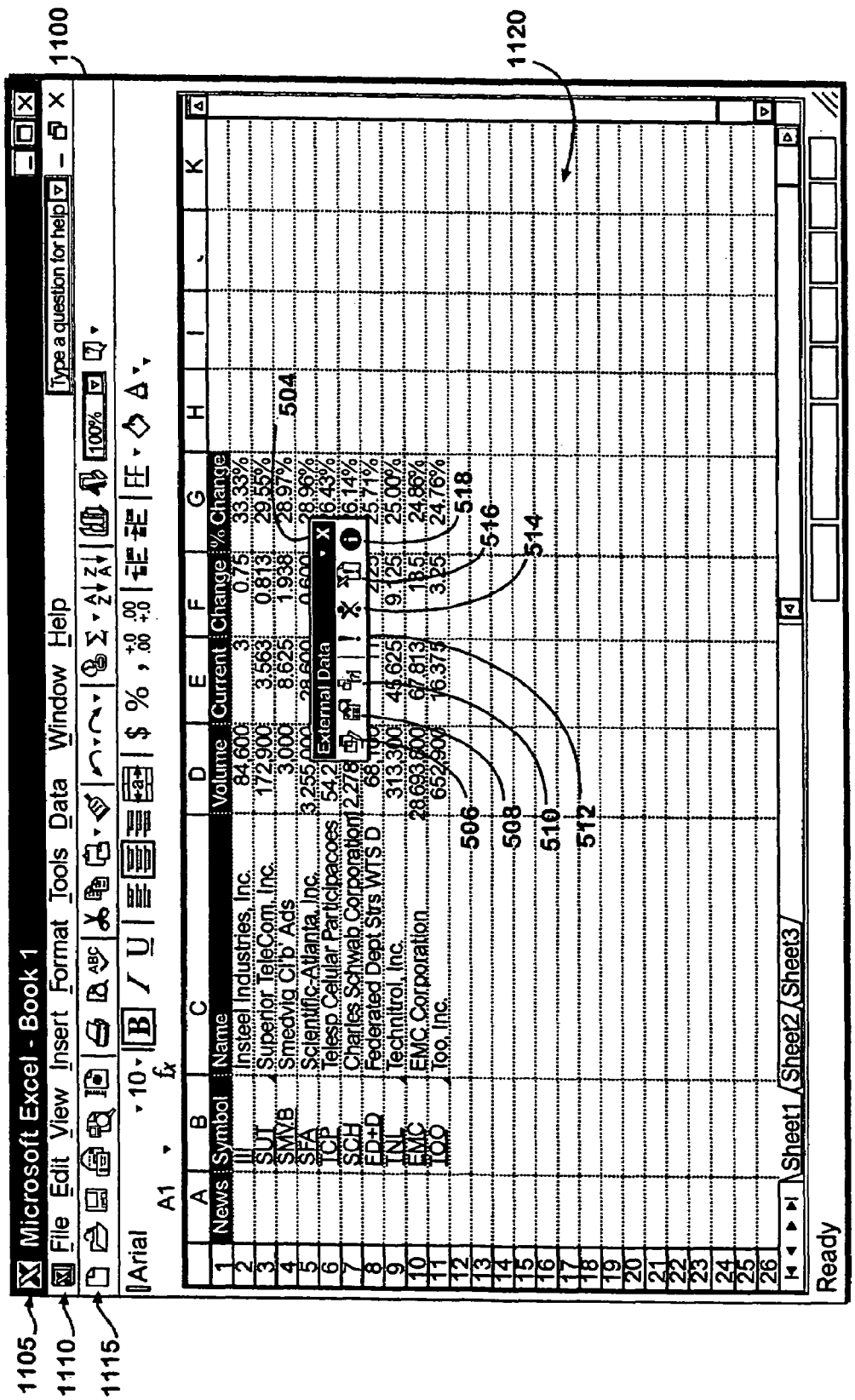
FIG. 22 is an illustration of a screen display in MICROSOFT EXCEL 2002 spreadsheet program showing the results of creating a refreshable Web Query using the "Edit with Microsoft Excel" module.

FIG. 22 is an illustration of a screen display in the MICROSOFT EXCEL 2002 spreadsheet program showing the results of creating a refreshable Web Query using the "Edit with Microsoft Excel" module. The screen display is identical to the screen display described previously in FIG. 14.

Figure 23:
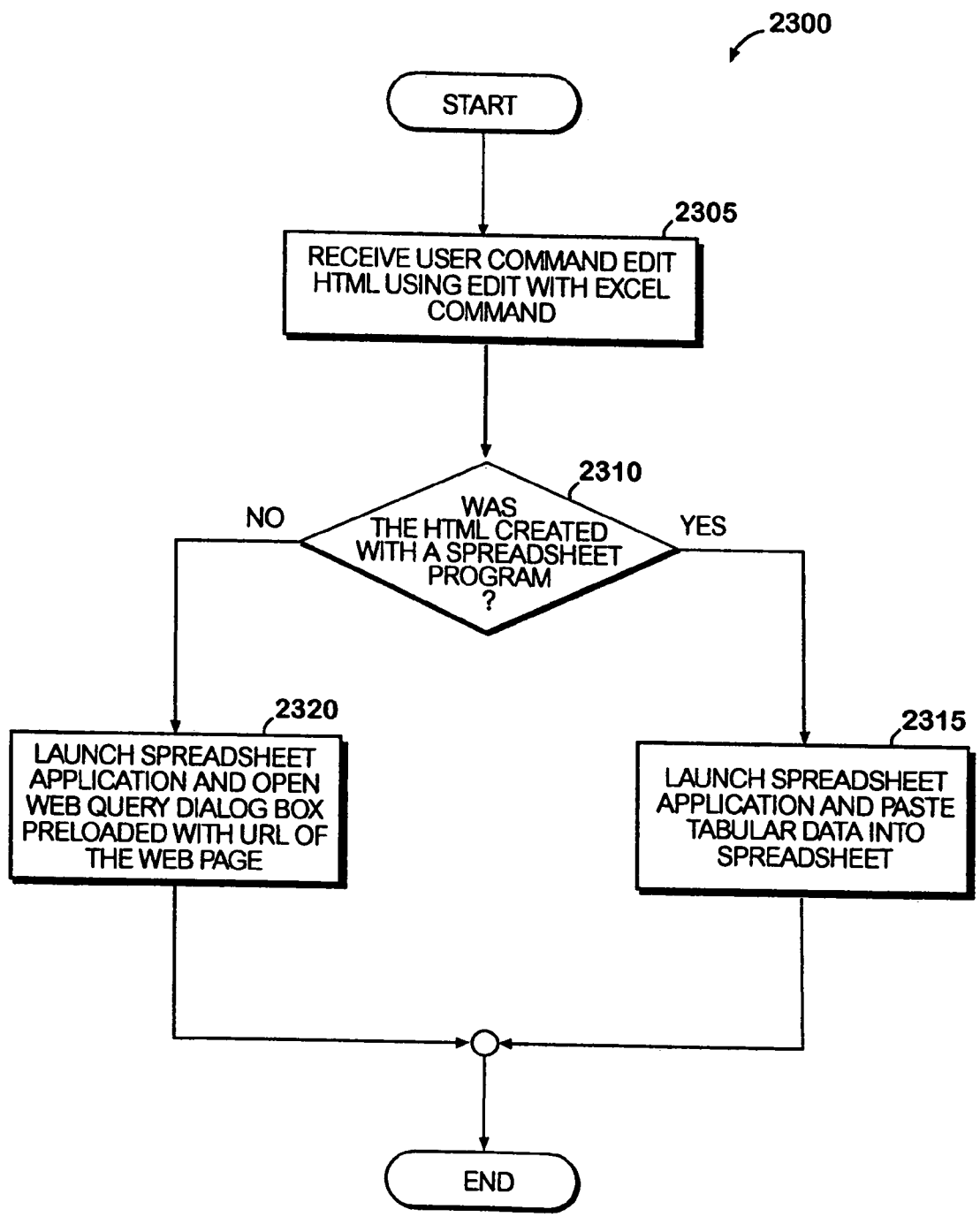
FIG. 23 is a logic flow diagram illustrating an exemplary technique of the "Edit with Microsoft Excel" module for applying the Refreshable Web Query utility to the MICROSOFT EXCEL 2002 spreadsheet program.

FIG. 23 is a logic flow diagram illustrating a routine 2300 for applying the "Edit with Microsoft Excel" module to an Internet browser application program. Routine 2300 begins at step 2305, in which the "Edit with Microsoft Excel" module receives a user command to edit the HTML document using a spreadsheet program. Routine 2300 then proceeds to step 2310, in which the "Edit with Microsoft Excel" module determines whether the HTML document the user wishes to edit was created with a spreadsheet program. The "Edit with Microsoft Excel" module retrieves an identifying tag from the head section of the HTML document that identifies the application program that was used to create the HTML document. Specifically, the "Edit with Microsoft Excel" module retrieves the META tag from the head section that identifies the application program used to create the file. If the META tag has a value that indicates that the MICROSOFT EXCEL 2002 spreadsheet program was used to create the HTML document, the "YES" branch is followed to step 2315, in which the "Edit with Microsoft Excel" module launches the MICROSOFT EXCEL 2002 spreadsheet program and imports the HTML document directly into a MICROSOFT EXCEL 2002 worksheet. Step 2315 is then followed by the "END" step.

If, however another application program, such as a word processing program was used to create the HTML document, then a refreshable Web Query cannot be created automatically. The "NO" branch is followed from step 2310 to step 2320, in which the "Edit with Microsoft Excel" module launches the MICROSOFT EXCEL 2002 spreadsheet program and opens a new Web Query dialog box. The Web Query dialog box is preloaded with the URL of the HTML document that the user selected the tabular data from. The user may then reselect the tabular data and import into the MICROSOFT EXCEL 2002 spreadsheet program.

The present invention thus provides an integrated method between an Internet browser module and a spreadsheet program to easily create a refreshable Web Query without requiring the user to have any prior knowledge of creating refreshable Web queries.

It should be understood that the foregoing pertains only to the exemplary embodiments of the present invention, and that numerous changes may be made to the embodiments described herein without departing from the spirit and scope of the invention.

What is claimed is:

1. A computer readable medium accessible to a computing system and on which is encoded a computer program for executing a computer process for importing data contained on a source document into a destination document, wherein the destination document is displayed within an associated application program having a user interface, the process comprising:

receiving a location for the source document by way of user input through a user interface region, the user input comprising a location identifier associated with a storage location for the source document, wherein the source document is a web page and the location identifier is a Uniform Resource Locator (URL);

accessing the source document at the identified location;

displaying the user interface region as part of the user interface of the application program running the destination document;

examining source code for the source document to identify table objects contained thereon by scanning for <TABLE> tags included within hypertext markup language of the source code for the source document;

indicating in the user interface region external data within the accessed source document that is available for insertion into the destination document by placing a plurality of icons, each icon of the plurality of icons being placed proximate one of the identified table objects;

receiving user input selecting at least a portion of the indicated external data, wherein receiving the user input comprises receiving a selection of one or more of the plurality of icons positioned proximate the external data and having a zIndex set to a maximum allowable value that corresponds to a highest layer in the source document; and invoking an import command to paste content associated with the selected one or more of the plurality of icons into the destination document, wherein the destination document is a spreadsheet document and the selected portion of external data comprises at least one table object having a plurality of data fields.

2. A computer readable medium as defined in claim 1, the computer process further comprising:

accessing the source document to retrieve an updated version of the selected portion of external data at a time subsequent to the inserting act; and replacing the inserted portion of external data in the destination document with the updated version of the portion of external data.

3. A computer readable medium accessible to a computing system and on which is encoded a computer program for executing a computer process for importing external data contained on a web page into a destination document opened and running within an associated application program having a user interface, the process comprising:

receiving user input comprising a location identifier specifying a location on which the web page is maintained;

in response to receiving the user input, accessing the web page at the specified location;

examining the accessed web page to identify external data includinci table objects on the web page that is available for insertion into the destination document, including scanning for <TABLE> tags included within hypertext markup language of source code for the web page;

displaying a plurality of graphically selectable identifiers in a user interface region of the user interface of the application program in which the destination document is open and running, each of the plurality of graphically selectable identifiers being placed proximate one of the identified table objects to identify at least a portion of the identified external data on the web page that is available for insertion into the destination document;

receiving user input selecting one or more of the plurality of graphically selectable identifiers, wherein receiving the user input comprises receiving a selection of one or more of the plurality of graphically selectable identifiers positioned proximate the external data and having a zIndex set to a maximum allowable value that corresponds to a highest layer in the source document; and invoking an import command to paste content associated with the selected one or more of the plurality of graphically selectable identifiers into the destination document, wherein the destination document is a spreadsheet document and the selected graphically selectable identifier identifies at least one table object having a plurality of data fields.

4. A computer readable medium as defined in claim 3, wherein the displaying act comprises: displaying at least a portion of the web page in the user interface region, wherein the plurality of graphically selectable identifiers comprise icons presented in association with the identified external data.

5. A computer readable medium as defined in claim 3, wherein the computer process further comprises:

accessing the web page to retrieve an updated version of the external data represented by the selected graphically selectable identifier at a time subsequent to the inserting act; and replacing the inserted external data in the destination document with the updated version of the selected external data.

6. A computer readable medium accessible to a computing system and on which is encoded a computer program for executing a computer process for importing external data contained on a web page into an electronic document opened within an associated application program having a user interface, the process comprising:

receiving a first user command to add external data into the electronic document;

in response to the first user command, displaying a user interface component for assisting the user with adding external data into the electronic document, the user interface component being run by the application program associated with the electronic document;

receiving a second user command specifying a web page on which external data is contained;

in response to the second user command, accessing the web page to identify external data contained thereon that is available for insertion into the-electronic document;

examining source code for the web page to identify table objects contained thereon by scanning for <TABLE> tags included within hypertext markup language of the source code for the web page;

indicating, in the user interface component, a portion of external data on the web page that is available for insertion into the-electronic document by placing a plurality of icons, each icon of the plurality of icons being placed proximate one of the identified table objects;

receiving a third user command selecting the indicated portion of external data, wherein receiving the user input comprises receiving a selection of one or more of the plurality of icons positioned proximate the external data, the icon being created and associated with the tabular data at each instance tabular data is encountered, and the icon having a zIndex set to a maximum allowable value that corresponds to a highest layer in the source document; and invoking an import command to paste content associated with the selected one or more of the plurality of icons into the electronic document, wherein the electronic document is a spreadsheet document and the selected portion of external data comprises at least one table object having a plurality of data fields.

7. A computer readable medium as defined in claim 6, wherein the indicating act comprises: displaying, in the user interface region, at least one graphically selectable identifier that represents the identified available external data.

8. A computer readable medium as defined in claim 7, wherein the displaying act comprises: displaying at least a portion of the web page in the user interface region, the displayed portion of the web page embodying the identified available external data, wherein the at least one graphically selectable identifier comprises an icon presented in association with the displayed portion of the web page.

9. A computer readable medium as defined in claim 6, the computer process further comprising:

accessing the web page to retrieve an updated version of the selected external data at a time subsequent to the inserting act; and replacing the inserted portion of external data in the electronic document with the updated version of the selected external data.

* * * * *

UNITED STATES PATENT AND TRADEMARK OFFICE
CERTIFICATE OF CORRECTION

| | | |
|---|---|---|
| PATENT NO. | : 7,539,944 B2 | Page 1 of 2 |
| APPLICATION NO. | : 11/061904 | |
| DATED | : May 26, 2009 | |
| INVENTOR(S) | : Gauthier et al. | |

It is certified that error appears in the above-identified patent and that said Letters Patent is hereby corrected as shown below:

On the Title Page, in field (63), under "Related U.S. Application Data", in column 1, lines 1–2, delete
"(63)   Continuation of application No. 09/819,176, filed on
         Mar. 27, 2001, now Pat. No. 6,948,134." and
insert
-- (63)   Continuation of application No. 09/819,176, filed on
         Mar. 27, 2001, now Pat. No. 6,948,134.
         Provisional application No. 60/220,239, filed on
         Jul. 21, 2000. --, therefor.

In column 1, line 53, delete "("URL)" and insert -- ("URL") --, therefor.

In column 4, line 25, delete "anther" and insert -- another --, therefor.

In column 19, line 3, delete "data.." and insert -- data. --, therefor.

In column 22, line 23, delete ""htp://"," and insert -- "ftp://", --, therefor.

In column 22, line 34, delete "Create" and insert -- "Create --, therefor.

In column 23, line 66, delete "(FIG. 1)" and insert -- (FIG. 11) --, therefor.

In column 25, line 14, delete ""htp://"," and insert -- "ftp://", --, therefor

In column 27, line 60, delete "If" and insert -- IF --, therefor.

In column 28, line 3, delete "&ieSrcURL," and insert -- & ieSrcURL, --, therefor.

In column 33, line 60, in Claim 3, delete "includinci" and insert -- including --, therefor.

UNITED STATES PATENT AND TRADEMARK OFFICE
CERTIFICATE OF CORRECTION

PATENT NO.        : 7,539,944 B2
APPLICATION NO. : 11/061904
DATED             : May 26, 2009
INVENTOR(S)       : Gauthier et al.

It is certified that error appears in the above-identified patent and that said Letters Patent is hereby corrected as shown below:

In column 34, line 52, in Claim 6, delete "the-electronic" and insert -- the electronic --, therefor.

In column 34, line 59, in Claim 6, delete "the-electronic" and insert -- the electronic --, therefor.

Signed and Sealed this

Fourth Day of August, 2009

JOHN DOLL
*Acting Director of the United States Patent and Trademark Office*